United States Patent
Borac

(10) Patent No.: US 7,277,094 B2
(45) Date of Patent: Oct. 2, 2007

(54) COMPUTER GRAPHICS SYSTEM AND COMPUTER-IMPLEMENTED METHOD FOR GENERATING SMOOTH FEATURE LINES FOR SUBDIVISION SURFACES

(75) Inventor: Silviu Borac, Picton (CA)

(73) Assignee: Mental Images GmbH, Berlin (DE)

( * ) Notice: Subject to any disclaimer, the term of this patent is extended or adjusted under 35 U.S.C. 154(b) by 853 days.

(21) Appl. No.: 10/062,192

(22) Filed: Feb. 1, 2002

(65) Prior Publication Data

US 2002/0154115 A1 Oct. 24, 2002

Related U.S. Application Data

(60) Provisional application No. 60/265,855, filed on Feb. 1, 2001.

(51) Int. Cl.
*G06T 17/00* (2006.01)

(52) U.S. Cl. .................. 345/420; 345/421; 345/423

(58) Field of Classification Search .............. 345/420, 345/423, 428, 582, 441, 581, 421, 425; 703/2
See application file for complete search history.

(56) References Cited

U.S. PATENT DOCUMENTS 6,553,337 B1 * 4/2003 Lounsbery .................. 703/2
6,603,473 B1 * 8/2003 Litke et al. ................ 345/420

OTHER PUBLICATIONS

A. Levin, "Combined subdivision schemes for the design of surfaces satisfying boundary conditions," Computer-Aided Geometric Design, Jun. 1999, Elsevier, Netherlands, vol. 16, No. 5, pp. 345-354.

A. Levin, "Interpolating nets of curves by smooth subdivision surfaces," Computer Graphics Proceedings, SIGGRAPH 1999, Proc. of SIGGRAPH 99: 26th Int'l Conf on Comp Graphics And Interactive Techniques, Los Angeles, CA., U. S. A., Aug. 8-13, 1999, pp. 57-64.

(Continued)

*Primary Examiner*—Kimbinh T. Nguyen
(74) *Attorney, Agent, or Firm*—Jacobs & Kim LLP; David A. Jacobs

(57) ABSTRACT

An arrangement is described for generating a representation of a feature in a surface defined by a mesh representation, the mesh comprising at a selected level a plurality of points including at least one point connected to a plurality of neighboring points by respective edges, the feature being defined in connection with the vertex and at least one of the neighboring points and the edge interconnecting the vertex and the at least one of the neighboring points in the mesh representation. The feature generating arrangement comprises a weight vector generator module and a feature representation generator module. The weight vector generator module is configured to generate at least one weight vector based on a parameterized subdivision rule defined at a plurality of levels, for which a value of at least one parameter differs at at least two levels in the mesh. The feature representation generator module configured to use the at least one weight vector and positions of the vertex and the neighboring points to generate the representation of the feature. One embodiment of the arrangement generates a smooth feature line in the subdivision surface.

1 Claim, 9 Drawing Sheets

OTHER PUBLICATIONS

P. Brunet, "Including shape handles in recursive subdivision surfaces," Computer Aided Geometric Design, XX, XX, vol. 5, No. 1, 1988, pp. 41-50.

Dong Wenlong, et al, "Efficient region-selective sub-division for 3-D meshes," Signals, Systems and Computers 1999, Conference record of the 33d Asilomar conference, Oct. 23-24, 1999, Piscataway NJ, IEEE, Oct. 24, 1999, pp. 715-719.

H. Hoppe, et al., "Piecewise smooth surface reconstruction," Computer Graphics Proceedings, Annual Conference Series, SIGGRAPH, XX, XX, Jul. 24, 1994, pp. 295-302.

* cited by examiner

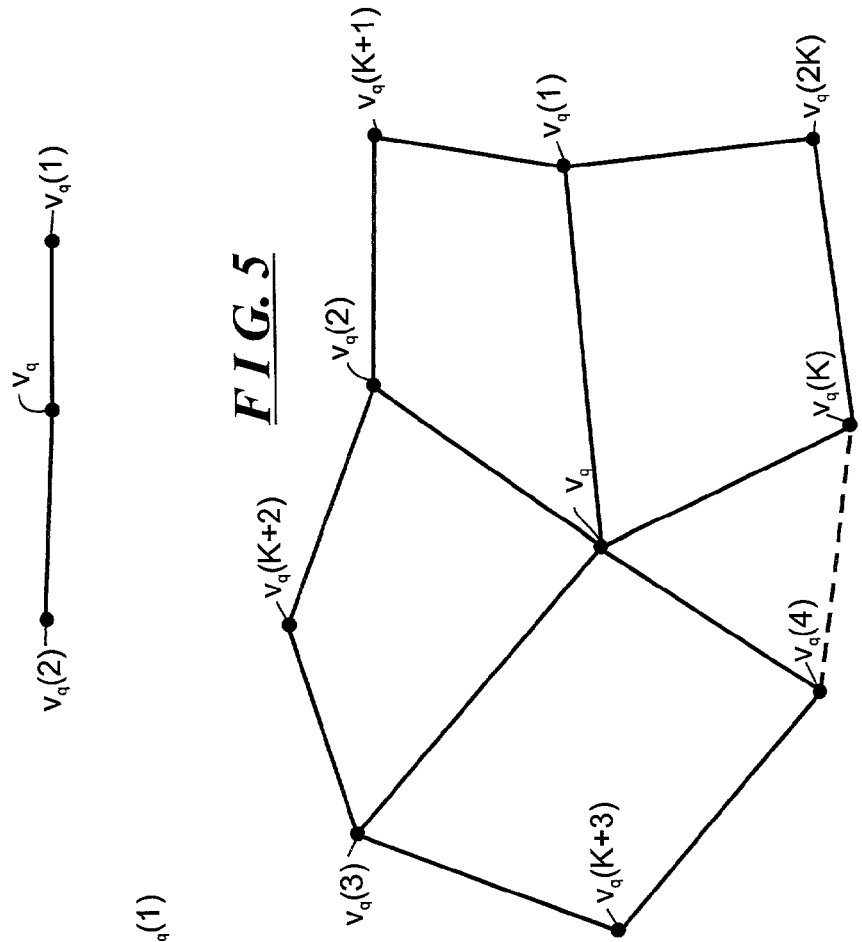
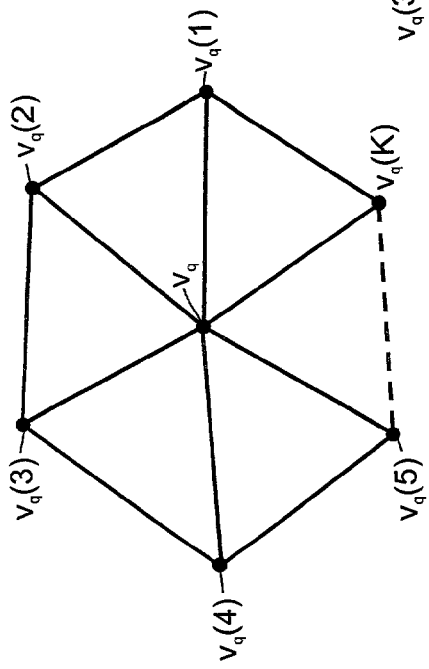

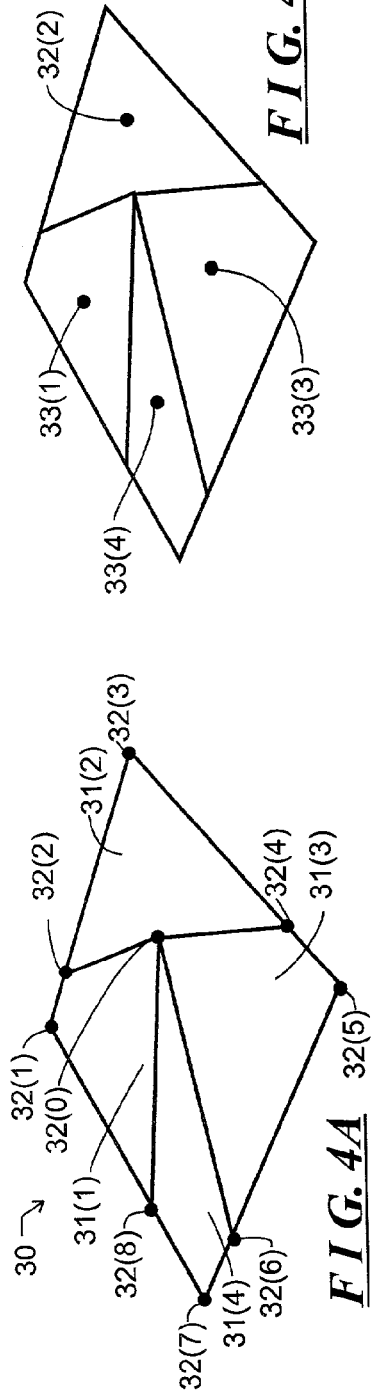
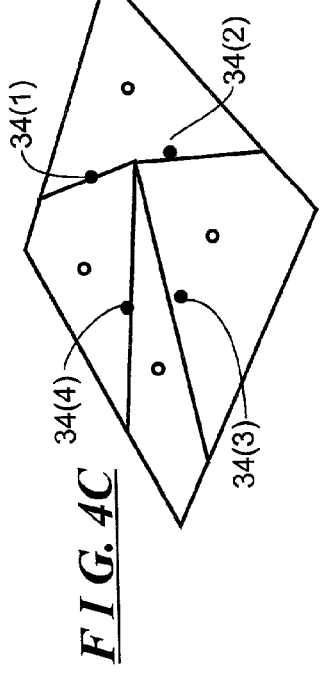
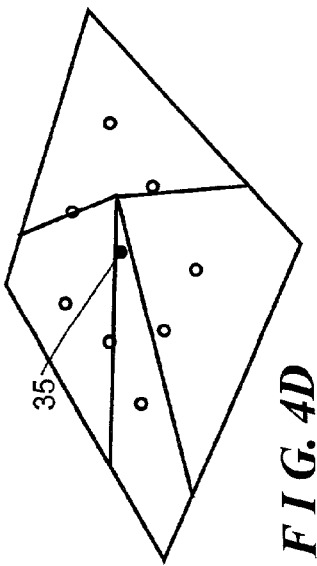
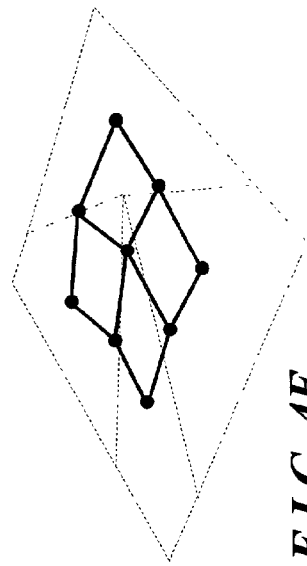
FIG. 4A
FIG. 4B
FIG. 4C
FIG. 4D
FIG. 4E

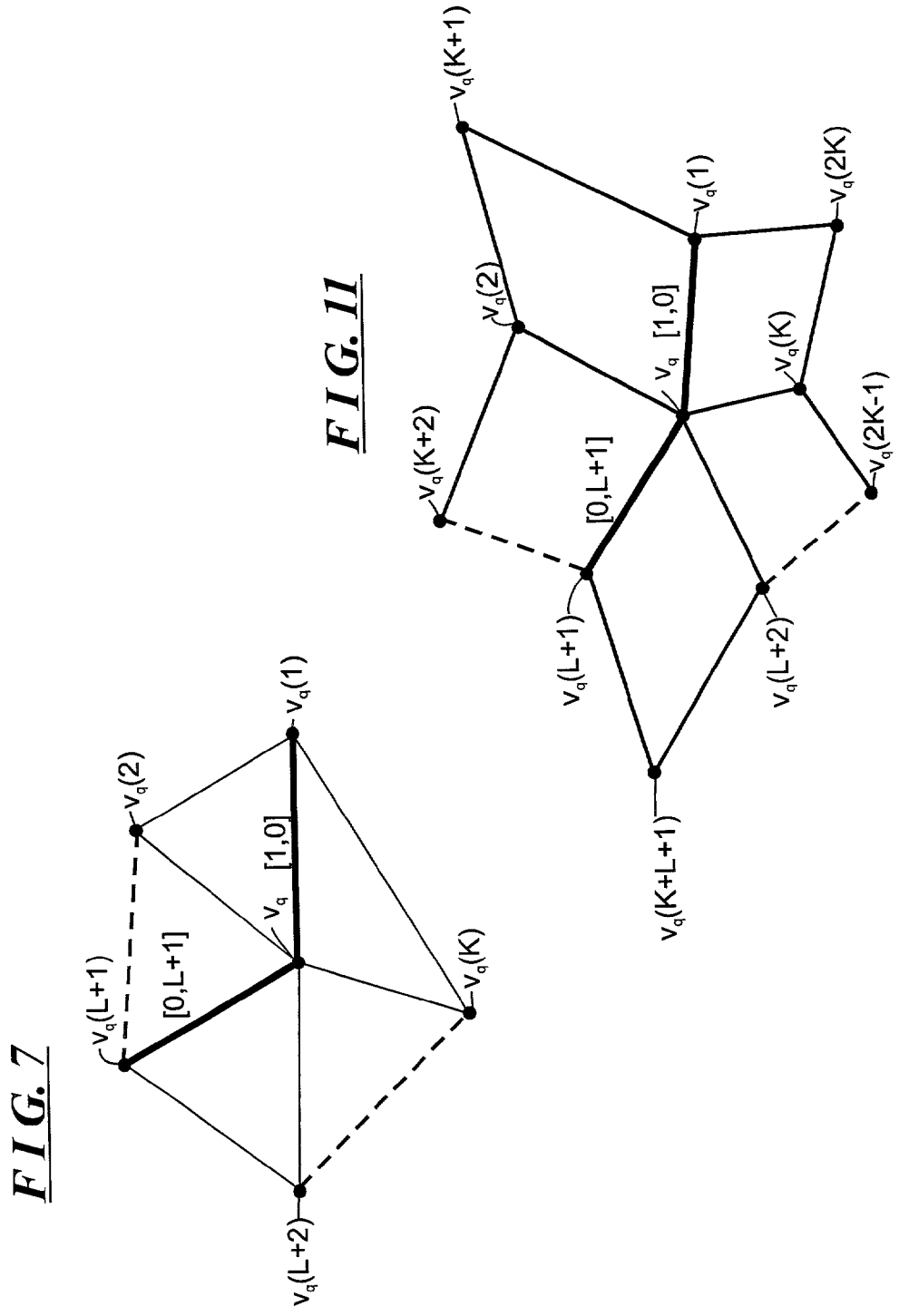

COMPUTER GRAPHICS SYSTEM AND COMPUTER-IMPLEMENTED METHOD FOR GENERATING SMOOTH FEATURE LINES FOR SUBDIVISION SURFACES

This application claims priority from U.S. Provisional Application for Patent Ser. No. 60/265,855 filed Feb. 1, 2001.

FIELD OF THE INVENTION

The invention relates generally to the field of computer graphics, and more specifically to generation of smooth feature lines on subdivision surfaces representing surfaces of objects.

BACKGROUND OF THE INVENTION

Generally, in computer graphics, objects are represented as surfaces, with the surfaces being represented by meshes at a particular level. A mesh at a particular consists of a set of vertices, or points in three-dimensional space, which are interconnected by edges. The edges define polygonal faces, which may be in the form of triangles, quadrilaterals, and so forth. In some computer graphic operations, it is desirable to generate a representation of a surface at a finer resolution than a current representation. There are several popular methodologies for generating a representation of a surface at a finer resolution than a current representation, including a Catmull-Clark surface subdivision methodology, which is used in connection with surfaces defined by a quadrilateral mesh, and a Loop surface subdivision methodology, which is used in connection with surface defined by a triangular mesh. Generally, both methodologies make use of respective subdivision rules at respective vertices defining the surface at a particular level in the mesh to generate a mesh in a next higher subdivision level. The surface of the respective object, which is referred to as the "subdivision surface" or "limit surface," is taken as being defined by a mesh as the subdivision level approaches infinity.

A feature on a subdivision surface can be defined by a feature line in the mesh that defines the respective surface. A feature line can be in the form of a sharp crease or a smooth curve. For a smooth feature line, a normal vector, which is the vector that is perpendicular to a plane that is tangent to the surface, will vary continuously across the smooth feature line. On the other hand, for a sharp crease, the normal vector varies discontinuously across the crease, and in fact is not defined at the crease. However, a definition for a smooth curve can be derived from a definition for a sharp crease using one or more parameters that are used to define the sharpness of the curve across vertices in the mesh at a particular subdivision level. D. Zorin, "Stationary Subdivision And Multi-Resolution Surface Representation," Ph.D. Thesis, California Institute of Technology, Pasadena, Calif., 1998, describes a methodology for generating a smooth feature line using parameters, but the methodology described there results in surfaces of relatively low quality, even in surfaces that are not smooth at some vertices in the surface topology. T. DeRose, et al., "Subdivision surfaces in character animation," SIGGRAPH 98 Conference Proceedings, Annual Conference Series, pages 85-94, ACM SIGGRAPH, 1998, describes a methodology for generating a smooth feature line based on applying a subdivision rule corresponding to sharp creases, as described in H. Hoppe, et al., "Piecewise Smooth Surface reconstruction," SIGGRAPH 94 Conference Proceedings, Annual Conference Series, ACM SIGGRAPH, 1994, up to a selected fineness level, and a rule corresponding to smooth interior points thereafter. Applying the two distinctly different types of rules makes efficient evaluation of the resulting surface difficult.

SUMMARY OF THE INVENTION

The invention provides a new and improved system and method for generating a smooth feature line in a subdivision surface.

In brief summary, the invention provides an arrangement for generating a representation of a feature in a surface defined by a mesh representation, the mesh comprising at a selected level a plurality of points including at least one point connected to a plurality of neighboring points by respective edges, the feature being defined in connection with the vertex and at least one of the neighboring points and the edge interconnecting the vertex and the at least one of the neighboring points in the mesh representation. The feature generating arrangement comprises a weight vector generator module and a feature representation generator module. The weight vector generator module is configured to generate at least one weight vector based on a parameterized subdivision rule defined at a plurality of levels, for which a value of at least one parameter differs at at least two levels in the mesh. The feature representation generator module configured to use the at least one weight vector and positions of the vertex and the neighboring points to generate the representation of the feature.

One embodiment of the invention comprises an arrangement for generating a smooth feature line in the subdivision surface.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3 depicts a stencil useful in understanding the Loop surface subdivision methodology;

FIGS. 4A through 4E depict a mesh representing a surface to which the Catmull-Clark surface subdivision methodology has been applied;

FIG. 5 depicts a stencil useful in understanding the Catmull-Clark surface subdivision methodology;

FIG. 6 depicts a stencil useful in understanding a methodology for generating a sharp crease on a subdivision surface;

FIG. 7 depicts a stencil useful in understanding a methodology for generating a smooth feature line used in connection with subdivision surfaces defined by triangular meshes;

FIGS. 8 and 9 depict tables of coefficients used in the methodology used in connection with surfaces defined by triangular meshes described in connection with FIG. 7;

FIG. 11 depicts a stencil useful in understanding a methodology for generating a smooth feature line used in connection with subdivision surfaces defined by quadrilateral meshes;

FIGS. 12 and 13 depict tables of coefficients used in the methodology used in connection with surfaces defined by quadrilateral meshes described in connection with FIG. 11.

DETAILED DESCRIPTION OF AN ILLUSTRATIVE EMBODIMENT

Figure 1:
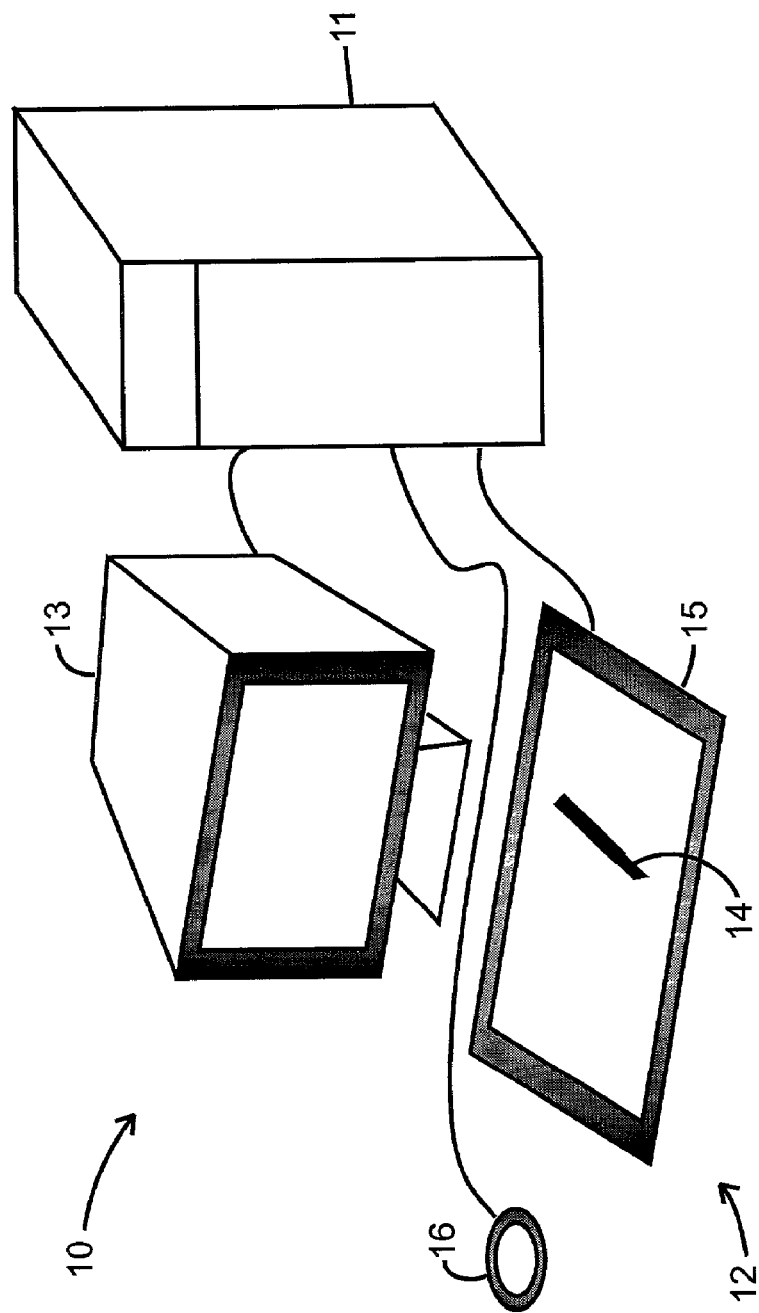
FIG. 1 depicts a computer graphics system including an arrangement for generating a smooth feature line in a subdivision surface, constructed in accordance with the invention.

FIG. 1 depicts a computer graphics system 10 including an arrangement for generating a smooth feature line in connection with a subdivision surface, constructed in accordance with the invention. With reference to FIG. 1, the computer graphics system includes a processor module 11, one or more operator input devices 12 and one or more display devices 13. The display device33(s) 13 will typically comprise a frame buffer, video display terminal or the like, which will display information in textual and/or graphical form on a display screen to the operator. The operator input devices 12 for a computer graphics system 10 will typically include a pen 14 which is typically used in conjunction with a digitizing tablet 15, and a trackball or mouse device 16. Generally, the pen 14 and digitizing tablet will be used by the operator in several modes. In one mode, the pen 14 and digitizing tablet are used to provide updated shading information to the computer graphics system. In other modes, the pen and digitizing tablet are used by the operator to input conventional computer graphics information, such as line drawing for, for example, surface trimming and other information, to the computer graphics system 10, thereby to enable the system 10 to perform conventional computer graphics operations. The trackball or mouse device 16 can be used to move a cursor or pointer over the screen to particular points in the image at which the operator can provide input with the pen and digitizing tablet. The computer graphics system 10 may also include a keyboard (not shown) which the operator can use to provide textual input to the system 10.

The processor module 11 generally includes a processor, which may be in the form of one or more microprocessors, a main memory, and will generally include one a mass storage subsystem including one or more disk storage devices. The memory and disk storage devices will generally store data and programs (collectively, "information") to be processed by the processor, and will store processed data which has been generated by the processor. The processor module includes connections to the operator input device(s) 12 and the display device(s) 13, and will receive information input by the operator through the operator input device(s) 12, process the input information, store the processed information in the memory and/or mass storage subsystem. In addition, the processor module can provide video display information, which can form part of the information obtained from the memory and disk storage device as well as processed data generated thereby, to the display device(s) for display to the operator. The processor module 11 may also include connections (not shown) to hardcopy output devices such as printers for facilitating the generation of hardcopy output, modems and/or network interfaces (also not shown) for connecting the system 10 to the public telephony system and/or in a computer network for facilitating the transfer of information, and the like.

The invention provides an arrangement for generating a smooth feature line in a three-dimensional subdivision surface. The subdivision surface, in turn, is defined by control points that are interconnected by edges to form a three-dimensional mesh. Generally, a subdivision surface is initially defined by a mesh at a particular degree of granularity or fineness. Using one of several methodologies, the mesh can be refined through a series of levels of increasing subdivision levels, with the subdivision surface being the limit as the subdivision level approaches infinity. In the following, the each mesh level will be identified an index, with one mesh level being identified by index "j" and the next higher subdivision level mesh being identified by index "j+1." The subdivision surface is essentially defined by the positions of the surface's "limit points," which are the essentially the control points as the subdivision level approaches infinity, and the orientations of the associated normal vectors. Each normal vector defines the orientation of a tangent plane at the respective point on the subdivision surface and, in turn, can be defined by the cross product of vectors that are tangent to the subdivision surface at the respective point.

Before describing the operations performed by the smooth feature line generating arrangement, it would be helpful to describe two surface subdivision methodologies, namely the aforementioned Loop surface subdivision methodology and a Catmull-Clark surface subdivision methodology, with which the arrangement is used.

Figure 2:
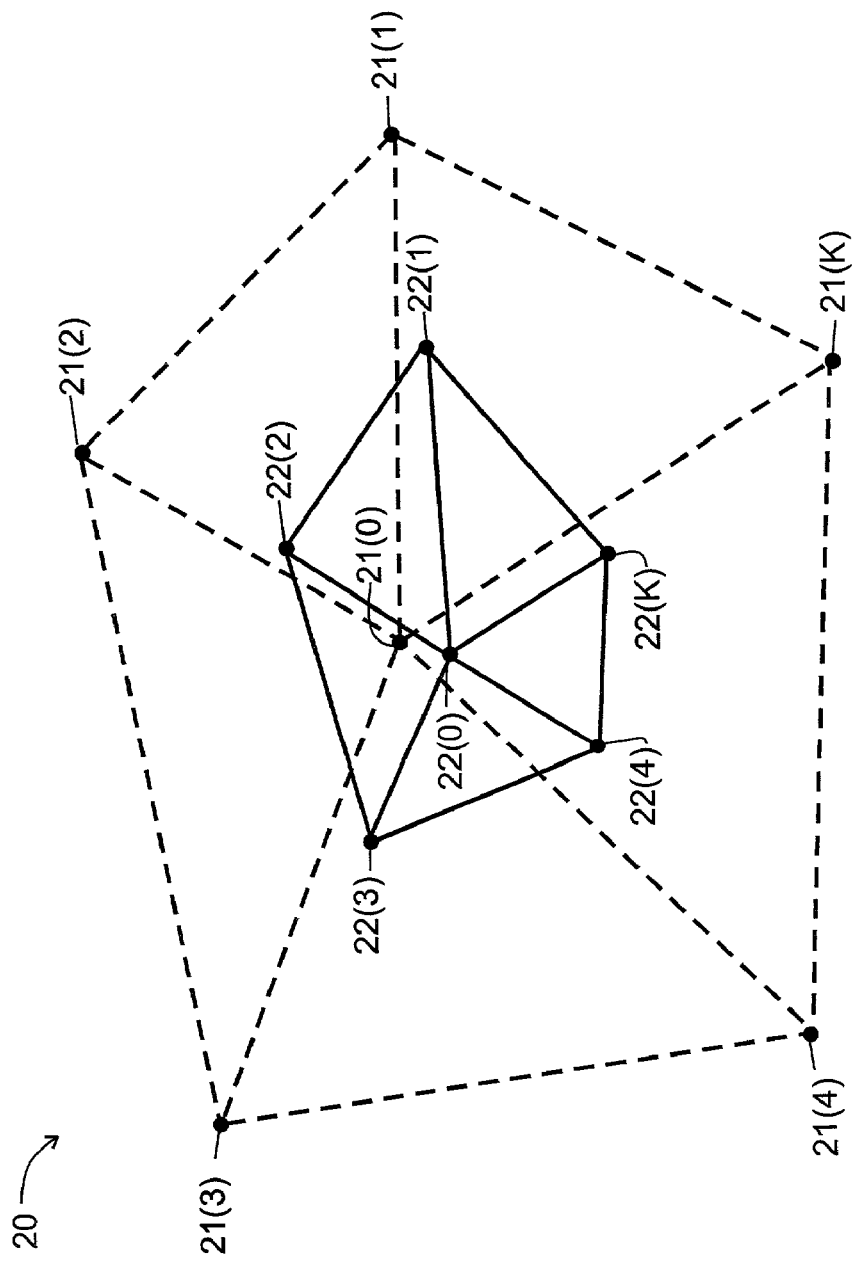
FIG. 2 depicts a mesh representing a surface to which the Loop surface subdivision methodology has been applied.

Loop's surface subdivision methodology will be described in connection with FIGS. 2 and 3. FIG. 2 depicts a portion of an illustrative surface defined by a mesh, and a subdivision surface derived therefrom, and FIG. 3 depicts a stencil useful in understanding the surface subdivision methodology. Generally, in Loop's surface subdivision methodology, each triangular face in the original mesh is split into a plurality of subfaces, the subfaces defining the next higher subdivision level mesh. The vertices of the next higher subdivision level mesh are positioned using weighted averages of the positions of the vertices in the original mesh. More specifically, and with reference to FIG. 2, a mesh 20 at a "j" subdivision level is depicted that includes a vertex $v_q$ (vertex $v_q = v_q(0)$) 21(0) located at position $c^j(q)$, and a plurality "K" of surrounding points $v_q(1)$ through $v_q(K)$ (generally, $v_q(k)$) 21(1) through 21(K) (generally identified by reference numeral 21(k)) located at positions at respective positions $c^j(1)$ through $c^j(K)$, the points $v_q(k)$ 21(k) being those points in the mesh 20 that are connected to vertex $v_q$ by edges. ("K," the number of points connected to vertex $v_q$ will sometimes be referred to as the vertex's "valence.") The stencil depicted in FIG. 3 is useful in understanding the ordering of the index "k" for the points surrounding the respective vertex $v_q$. Denoting the set of the indices of the points $v_q(k)$ in the mesh that are connected to vertex $v_q$ by $N(q,j)$, a mesh at the next higher subdivision level "j+1" corresponds to vertex $v'_q$ 22(0) located at position $c^{j+1}(q)$ and a set of surrounding points $v'_q(1)$ 22(1) at located at positions $c^{j+1}(1)$ and connected to the vertex $v'_q$ 22(0). The higher subdivision level mesh is constructed by providing the vertex $v'_q$ 22(0) at a position $c^{j+1}(q)$ that is determined by $$c^{j+1}(q) = (1 - a(K))c^j(q) + \frac{a(K)}{K} \sum_{k \in N(q,j)} c^j(k) \qquad (1)$$

and points $v'_q(1)$ 22(1) at positions $c^{j+1}(1)$ that are determined by $$c^{j+1}(l) = \frac{3}{8}[c^j(q) + c^j(k)] + \frac{1}{8}[c^j(k-1) + c^j(k+1)], k = 1, \ldots, K, \quad (2)$$

where the weighting factor $a(K)$ is given by $$a(K) = \frac{5}{8} - \left(\frac{3 + 2\cos\left(\frac{2\pi}{K}\right)}{8}\right)^2. \quad (3)$$

Equations (1) and (2) can be summarized in a single equation defining a subdivision rule using a subdivision matrix $S_{T,K}$ (where index "T" refers to "Triangular") as follows $$c^{j+1} = S_{T,K} c^j \quad (4)$$

which may be written component-wise as $$(c^{j+1})_l = \sum_m (S_{T,K})_{l,m} (c^j)_m, \quad (5)$$

where $$(S_{T,K})_{l,m} = \begin{cases} 1 - a(K) & \text{if } l = 0, m = 0 \\ \frac{a(K)}{2} & \text{if } l = 0, m = 1, \ldots, K \\ \frac{3}{8} & \text{if } l = 1, \ldots, K, m = 0 \\ & \text{or } l = m = 1, \ldots, K \\ \frac{1}{8} & \text{if } l = 2, \ldots, K, m = l - 1 \\ & \text{or } l = 1, m = K \\ & \text{or } l = 1, \ldots, K, m = l + 1 \\ & \text{or } l = K, m = 1 \\ 0 & \text{otherwise} \end{cases} \quad (6)$$

where indices "l" and "m" range from "zero" to, and including, "K."

Equations (1) and (2), or equivalently equations (4) through (6), are applied by selecting each point in the mesh at subdivision level "j" as a vertex, to provide points for the mesh at the subdivision level "j+1." Loop's surface subdivision methodology can be applied recursively to provide a mesh at any desired subdivision level. It will be appreciated that equation (2) will provide that the point $v'_q(1)$ 22(1) that is created when the methodology is applied to point $v_q$ 21(0) as the vertex will be in the same position when the methodology is applied to point $v_q(k)$ 21(k) as the vertex.

It will be appreciated that, the Loop surface subdivision methodology provides (i) one new point (reference points $v'_q(1)$ described above), at location $c^{j+1}(1)$ in the next higher ("j+1") subdivision level mesh, for, and generally somewhere between, each pair of points in the level "j" mesh, and (ii) a relocated point (reference vertex $v'_q$ described above), at location $c^{j+1}(q)$ in the "j+1" level mesh for, and generally somewhat near, each point in the "j" level mesh, which are interconnected to form the "j+1" level mesh.

The Catmull-Clark subdivision methodology produces smooth surfaces using a small number of neighboring vertices. The Catmull-Clark surface subdivision methodology will be described in connection with FIGS. 4A through 4E and 5. FIG. 4A depicts an illustrative surface defined by a mesh, and FIGS. 4B through 4E are useful in understanding operations performed in generating a subdivision surface derived from the surface depicted in FIG. 4A. FIG. 5 depicts a stencil useful in understanding the surface subdivision methodology, and in particular is useful in understanding the ordering of the index "k" for the points surrounding the vertex $v_q$ (vertex $v_q = v_q(0)$) around which the surface subdivision methodology is to be performed. With reference to FIG. 4A, that FIG. depicts a mesh 30 consisting of four quadrilaterals 31(1) through 31(4). Each quadrilateral is referred to as a face. The quadrilaterals are defined by points 32(0), which is common to all of the quadrilaterals 31(1) through 31(4), and other points 32(1) through 32(8). Generally, the Catmull-Clark surface subdivision methodology is performed in a series of iterations, including (i) a face point generation iteration, in which, for each face, a face point 33(1) through 33(4) is generated as the average of the points 32(p) defining the respective face (reference FIG. 4B);

(ii) an edge point generation iteration in which, for each edge, a new edge point 34(1) through 34(4) is generated as the average of the midpoint of the original edge with the two new face points of the faces adjacent to the edge (reference FIG. 4C; the face points generated during the face point generation iteration are shown as circles);

(iii) a vertex point iteration in which a vertex point 35 is generated in relation to the positions of the new face points generated in iteration (i) for faces that are adjacent to the original vertex point, the positions of the midpoints of the original edges that are incident on the original vertex point, the position of the original vertex point, and the valence of the original vertex point (reference FIG. 4D; the face and edge points generated during the face point and edge point generation iterations are shown as circles); and (iv) a mesh connection step (reference FIG. 4E) in which:
(a) each new face point is connected to the edge points of the edges defining the original face; and
(b) each new vertex point is connected to the new edge points of all original edges incident on the original vertex point.

More specifically, in the Catmull-Clark subdivision methodology, denoting, for a vertex $v_q$ at location $c^j(q)$, (i) the set of indices of first-order neighboring points $c^j(1)$ that are connected thereto (for example, for point 32(0), point 32(2) and 32(8)) by $N_e(q,j)$, and (ii) the set of indices of second-order neighboring points that are opposite to vertex $c^j(q)$ with respect to the level "j" faces (for example, for point 32(0), point 32(1)) that are incident with vertex $c^j(q)$ by $N_f(q,j)$ a mesh at the next higher subdivision level "j+1" is constructed as follows. In the face point generation iteration, the face points are generated and located at positions $c^{j+1}(m_i)$ determined as follows $$c^{j+1}(m_i) = \frac{1}{4}(c^j(q) + c^j(l_i) + c^j(l_{i+1}) + c^j(r_i)), \quad (7)$$

$$m_i \in N_f(q, j+1), l_i, l_{i+1} \in N_e(q, j), r_i \in N_f(q, j).$$

In the edge point generation iteration, the edge points are generated and located at positions $c^{j+1}(l_i)$ determined as follows:

$$c^{j+1}(l_i) = \frac{1}{4}(c^j(q) + c^j(k_i) + c^{j+1}(m_{i-1}) + c^{j+1}(m_i)), \quad (8)$$

$$l_i \in N_e(q, j+1), k_i \in N_e(q, j), m_{i-1}, m_i \in N_f(q, j+1)$$

In the vertex point generation iteration, the new vertex points are generated and located at positions as follows:

$$c^{j+1}(q) = \frac{K-2}{K}c^j(q) + \frac{1}{K^2}\sum_{i=0}^{k-1} c^j(l_i) + \frac{1}{K^2}\sum_{i=0}^{k-1} c^{j+1}(m_i) \quad (9)$$

$$l_i = \in N_e(j+1, q), m_i \in N_f(j+1, q).$$

In terms of only points $c^j$, that is substituting for the last term in equation (9), $$c^{j+1}(q) = \left(1 - \frac{7}{4K}\right)c^j(q) + \frac{3}{2}\frac{1}{K^2}\sum_{l \in N_e(q,j)} c^j(l) + \frac{1}{4K^2}\sum_{m \in N_f(q,j)} c^j(m). \quad (10)$$

Generally, for quadrilateral meshes, the arrangement makes use of the Catmull-Clark methodology, except for the case of K=3 in equation (9). In that case, the arrangement makes use of $$c^{j+1}(q) = (1 - 8\gamma)c^j(q) + 4\gamma\frac{1}{K}\sum_{l \in N_e(q,j)} c^j(l) + 4\gamma\frac{1}{K}\sum_{m \in N_f(q,j+1)} c^{j+1}(m), \quad (11)$$

where $$\gamma = \frac{3}{38}.$$

Equation (11) would correspond to the Catmull-Clark methodology (equation (9)) with $$\gamma = \frac{1}{4K},$$

except that, for $$K = 3, \gamma = \frac{3}{38}$$

instead of $$\frac{1}{12}.$$

In terms of only points $c^j$ (compare equation (10))

$$c^{j+1}(q) = (1 - 7\gamma)c^j(q) + 6\gamma\frac{1}{K}\sum_{l \in N_e(q,j)} c^j(l) + \gamma\frac{1}{K}\sum_{m \in N_f(q,j)} c^j(m). \quad (12)$$

These equations can be summarized by a single equation defining a subdivision rule using the subdivision matrix $S_{Q,K}$ (where index "Q" refers to "Quadrilateral") as follows:

$$c^{j+1} = S_{Q,K} c^j \quad (13)$$

which may be written component-wise as $$(c^{j+1})_l = \sum_m (S_{Q,K})_{l,m} (c^j)_m, \quad (14)$$

where $$(S_{Q,K})_{l,m} = \begin{cases} 1 - \frac{7}{4K} & \text{if } l = 0, m = 0 \\ \frac{3}{2}\frac{1}{K^2} & \text{if } l = 0, m = 1, \ldots, K \\ \frac{1}{K^2} & \text{if } l = 0, m = K+1, \ldots, 2K \\ \frac{3}{8} & \text{if } l = 1, \ldots, K, m = 0 \text{ or } l \\ \frac{1}{16} & \text{if } l = 1, m = K \\ & \text{or } l = 2, \ldots, K, m = l-1 \\ & \text{or } l = 1, \ldots, K-1, m = l+1 \\ & \text{or } l = K, m = 1 \\ & \text{or } l = 1, m = 2K \\ & \text{or } l = 2, \ldots, K, m = K+l-1 \\ & \text{or } l = 1, \ldots, K, m = K+1 \\ \frac{1}{4} & \text{if } l = K+1, \ldots, 2K, m = 0, l-K, \\ & l-K+1, \text{ or } l \\ & \text{or } l = 2K, m = 0, K, 1 \text{ or } 2K \\ 0 & \text{otherwise} \end{cases} \quad (15)$$

where indices "l" and "m" range from "zero" to, and including, "2K."

As is apparent from the above discussion, the Catmull-Clark surface subdivision methodology applied to a quadrilateral mesh at one "j-th" subdivision level will produce a quadrilateral mesh at the next higher "j+1-st" subdivision level having the same number of points as the mesh at the "j-th" subdivision level, but the points in the higher ("j+1")

subdivision level may be at different positions than in the "j-th" level. Equations (7) through (12), or equivalently equations (13) through (15), are applied by selecting each point in the mesh at subdivision level "j" as a vertex, to provide points for the mesh at subdivision level "j+1." The Catmull-Clark surface subdivision methodology can be applied recursively to provide a mesh at any desired subdivision level.

Sharp creases in a subdivision surface maybe generated by local modifications of the surface subdivision equations described above (equations (6) through (8) in the case of a triangular mesh, equations (13) through (15) in the case of a quadrilateral mesh). This will be illustrated in connection with FIG. 6, which depicts a stencil that is useful in understanding the ordering of the index "k" for the points on opposing sides of a respective vertex $v_q$ (vertex $v_q = v_q(0)$) through which a crease is to occur. By marking the edges of the mesh at which a crease is to occur, chains of edges can be defined that will define the position of a crease on a subdivision surface. As in the cases of both triangular and quadrilateral meshes, the positions $c^{j+1}$ of vertices and points in the higher "j+1-st" subdivision level can be determined from positions of vertices and points $c^j$ in the "j-th" level using a defining a subdivision rule comprising a subdivision matrix $S_c$ (where index "C" refers to "crease") as follows:

$$c^{j+1} = S_C c^j \quad (16)$$

which may be written component-wise as $$(c^{j+1})_l = \sum_m (S_C)_{l,m} (c^j)_m, \quad (17)$$

where $$(S_C)_{l,m} = \begin{cases} \frac{3}{4} & \text{if } l = 0, m = 0 \\ \frac{1}{8} & \text{if } l = 0, m = 1 \text{ or } 2 \\ \frac{1}{2} & \text{if } l = 1 \text{ or } 2, m = 0 \text{ or } l \\ 0 & \text{otherwise} \end{cases}, \quad (18)$$

where indices "l" and "m" range from "zero" to, and including, "two." This subdivision rule can be used for creases in the cases subdivision surfaces defined by both triangular meshes and quadrilateral meshes.

The invention provides a system and method for generating smooth feature lines in subdivision surfaces. As with a sharp crease, a smooth feature line is defined by marking a series of edges at a given subdivision level, which edges are to define the feature line. The lowest subdivision level at which the edges that are associated with a smooth feature line are marked will be referred to as the definition level "$j_D$" for the smooth feature line In addition, a sharpness parameter will be associated with each marked edge in the definition level $j_D$ for the smooth feature line. In one embodiment, the value of the sharpness parameter is in the form of a real number in the interval [0,1], that is, in the interval between "zero" and "one," inclusive of the endpoints. If an edge has a sharpness parameter with the value "zero," there is no crease along the edge. On the other hand, if an edge has a sharpness parameter with the value "one," the edge forms part of a sharp crease as described above.

Generally, a smooth feature is obtained by using a subdivision rule that generalizes the subdivision rules described above (reference equations (4) through (6) in the case of a triangular mesh and equations (13) through (15) in the case of a quadrilateral mesh). The subdivision rule makes use of two parameters $s_1$ and $s_2$ which are the respective values of the sharpness parameter on two sides of a vertex across which a smooth feature line is to be generated. A subdivision surface's limit surface, that is, the surface defined by the subdivision surface's limit points, is smooth in the neighborhood of a smooth feature line. That is, for each point on the limit surface that is associated with a smooth feature line, that is, for each point for which the values of the sharpness parameters on respective sides of the point are other than "one," the orientation of the vector that is normal to the limit surface will vary continuously. However, for the limit surface at a point for which the sharpness parameter have the value is "one," which will be the case at a sharp crease, the normal vector will not be defined, since the orientation of the normal vector on respective sides of the point will differ.

Operations performed by the computer graphics system 10 in connection with generating a smooth feature line will be described in connection with FIGS. 7 through 10, in the case of a subdivision surface defined by a triangular mesh, and in connection with FIGS. 11 through 14, in the case of a subdivision surface defined by a quadrilateral mesh. In both cases, the smooth feature line will be defined by the positions of limit points, as well as the normal vectors at the respective limit point, in a region of a subdivision surface that is proximate the line corresponding to the edges that have been marked. As noted above, the normal vectors correspond to the cross product of two tangent vectors at the respective limit point, namely, a tangent vector along the smooth feature line at the respective limit point and a tangent vector across the smooth feature line at the respective limit point.

With reference to FIG. 7, that FIG. depicts a portion of a subdivision surface defined by a triangular mesh with vertex $v_q$ (vertex $v_q = v_q(0)$) and points $v_q(1)$ through $v_q(K)$ with indices numbered as depicted in the FIG. The vertices are labeled such that a crease, which is to define part of a smooth feature line, passes through point $v_q(1)$, vertex $v_q$ and point $v_q(L+1)$ along edges $v_q(1), v_q$ (which will be referred to as edge (1,0)) and $v_q, v_q(L+1)$ (which will be referred to as edge (0,L+1)). The value of the sharpness parameter associated with the edge (1,0) will be referred to as $s_1$ and the value of the sharpness parameter associated with the edge (0,L+1) will be referred to as $s_2$. Since edges (1,0) and (0,L+1) have been indicated as being edges that define a crease, the value of the sharpness parameter will be non-zero. The values of the sharpness parameters associated with the other edges that are on the vertex $v_q$ may be "zero," or non-zero. Generally the subdivision rule described in equation (4) (or, equivalently, equation (5)) can be used to determine the positions of respective vertices, using the subdivision matrix $$(S_{sc,T,K,L}(s_1, s_2))_{l,m} = \begin{cases} (1-s_3)(1-a(K)) + \frac{3}{4}s_3 & \text{if } l=0, m=0 \\ (1-s_3)\frac{a(K)}{K} + \frac{1}{8}s_3 & \text{if } l=0, m=1 \text{ or } L+1 \\ (1-s_3)\frac{a(K)}{K} & \text{if } l=0, m=2, \ldots, L \\ & \text{or } l=0, m=L+2, \ldots, K \\ \frac{3}{8} + \frac{1}{8}s_2 & \text{if } l=1, m=0 \text{ or } 1 \\ \frac{3}{8} + \frac{1}{8}s_1 & \text{if } l=L+1, m=0 \text{ or } L+1 \\ \frac{1}{8}(1-s_2) & \text{if } l=1, m=2 \text{ or } K \\ \frac{1}{8}(1-s_1) & \text{if } l=L+1, m=L \text{ or } L+2 \\ \frac{3}{8} & \text{if } l=2, \ldots, L, m=0 \\ & \text{or } l=L+2, \ldots, K, m=0 \\ & \text{or } l=m=2, \ldots, L \\ & \text{or } l=m=L+2, \ldots, K \\ \frac{1}{8} & \text{if } l=2, \ldots, L, m=l-1 \\ & \text{or } l=L+2, \ldots, K, m=l-1 \\ & \text{or } l=2, \ldots, L, m=l+1 \\ & \text{or } l=L+2, \ldots, K, m=l+1 \\ & \text{or } l=K, m=1 \\ 0 & \text{otherwise} \end{cases} \quad (19)$$

where, as in equation (6), indices "l" and "m" range from "zero" to, and including, "K," and where $$s_3 = \frac{1}{2}(s_1 + s_2),$$

the average of the values of the parameters $s_1$ and $s_2$ associated with the edges (1,0) and (0,L+1).

To ensure that the directions of the tangent vectors vary continuously at and near irregular vertices, the value(s) of the sharpness parameter(s) are gradually reduced as the level of the mesh increases. In the case of smooth feature lines, the repeated update of the value of the sharpness parameter as the level of the mesh increases would provide a value that approaches zero, which, in turn, will provide that the directions of the tangent vectors vary continuously at the limit surface. In one embodiment, for a vertex $v_q$ for which the sharpness parameters $s_1$ and $s_2$ have the same value "s" on both sides of the vertex (that is, $s_1=s_2$), the sharpness parameter update function is $$s(j+1) = (s(j))^2 \quad (20)$$

that is, s(j+1), the value of the sharpness parameters $s_1$ and $s_2$ at the higher "j+1-st" subdivision level mesh, is the square of s(j), the value of the sharpness parameters $s_1$ and $s_2$ at the lower ("j -th") level mesh. On the other hand, for a vertex $v_q$ for which values of sharpness parameters $s_1$ and $s_2$ are not constant across the vertex (that is, $s_1 \neq s_2$), the sharpness parameter update functions are a function of the values of both sharpness parameters $s_1$ and $s_2$. In one embodiment, the function is selected to be $$s_1(j+1) = \left(\frac{3}{4}s_1(j) + \frac{1}{4}s_2(j)\right)^2, \quad (21)$$

and $$s_2(j+1) = \left(\frac{1}{4}s_1(j) + \frac{3}{4}s_2(j)\right)^2, \quad (22)$$

essentially providing a linear combination corresponding to quadratic splines.

Since the values of the sharpness parameters $s_1$ and $s_2$ vary from level to level, the smooth curve subdivision matrix $(S_{sc,T,K,L}(s_1,s_2))_{lm}$ (equation (19)) will also not be constant from level to level. Accordingly eigen-analysis, which is conventionally used to determine positions of limit points and orientations of tangent vectors for subdivision surfaces, is not used here. As suggested above, a subdivision surface is defined by a collection limit points and normal vectors (or, equivalently, two tangent vectors for each normal vector), which, in turn, are provided by iteratively applying equation (4) from a definition level "$j_D$" for the mesh to the level $j=\infty$. The definition level $j_D$ is the lowest subdivision level "j" for which the respective smooth feature line is defined in the subdivision surface. Accordingly, in order to determine the positions of the limit points, the infinite subdivision matrix $$S_{sc,T,K,L,LP}(s_1, s_2) = \prod_{j=\infty}^{j_D} S_{sc,T,K,L}(s_1(j), s_2(j)), \quad (23)$$

is evaluated, where $S_{sc,T,K,L}(s_1(j),s_2(j))$ is the subdivision matrix described above in connection with equation (19) for sharpness parameters corresponding to the "j-th" level in the matrix product on the right-hand side of equation (23). For $S_{sc,T,K,L,LP}(s_1,s_2)$ on the left-hand side of equation (23), arguments $s_1$ and $s_2$ refer to the sharpness parameters at the definition level of the smooth feature line, that is, $s_1=s_1(j_D)$, and the subscript "LP" refers to "Limit Point." Since matrix multiplication is not commutative, the order of the factors in the matrix product in equation (23) is important. In equation (23), the order of the factors from left to right in the product extends from $j=\infty$ on the left to $j=j_D$ on the right, as suggested by equation (4).

The matrix product (equation (23)), converges to a "K+1"-by-"K+1" matrix that has "K+1" rows, with the components comprising each row being identical to the components of the other rows, in the same order. A vector of weight values $l_{LP}$ for determining the position $\sigma(q)$ of the limit point is obtained as follows:

$$l_{LP}(s_1,s_2) = v_{LP} \cdot S_{sc,T,K,L,LP}(s_1,s_2) \quad (24)$$

where vector $v_{LP}$ is a vector of weights that are used in determining the position of a limit point of a subdivision surface using the Loop subdivision methodology in the absence of a smooth feature line, that is, $$v_{LP} = \left(\frac{\omega(K)}{\varpi(K)+K}, \frac{1}{\varpi(K)+K}, \frac{1}{\varpi(K)+K}, \ldots, \frac{1}{\varpi(K)+K}\right), \quad (25)$$

where $$\varpi(K) = \frac{3K}{8a(K)}, \quad (26)$$

where a(K) is as defined in equation (3). The position $\sigma(q)$ of a limit point associated with a vertex $v_q(0)$ is computed from the position $c^{j_D}(q)$ of the vertex $v_8(0)$ and the positions $c^{j_D}(k)$, $k=1, \ldots, K$, of the neighboring points $v_q(k)$ around the vertex $v_q(0)$, in the mesh corresponding to the definition level $j_D$ of the smooth feature line in the subdivision surface, or to any subdivision level higher than the definition level, using the components of $l_{LP}$ as weight values. The components of limit point weight vector $l_{LP}(s_1,s_2)$ can be satisfactorily approximated by second degree polynomials in $s_1$ and $s_2$ using six values per component and per valence.

If $$L = \frac{K}{2},$$

symmetry considerations allow the number of values per component to be reduced. In that case, the components of limit point weight vector $l_{LP}$ satisfy the following symmetry relations:

1. The "i-th" component of limit point weight vector $l_{LP}$ equals the "K+2-i-th" component of $l_{LP}$, that is, $(l_{LP})_i = (l_{LP})_{K+2-i}$, for $$i = \frac{K}{2} + 2, \ldots, K.$$

This is a result of the fact that the subdivision matrix (equation (19)) is invariant upon reflection with respect to the crease line. As a result, approximations need only be generated for components $i=0, 1, \ldots,$ $$\frac{K}{2} + 1.$$

2. Further, since the subdivision matrix (equation (19)) is also symmetric in $s_1$ and $s_2$, $$(l_{LP}(s_1, s_2))_i = (l_{LP}(s_2, s_1))_{\frac{K}{2}+2-i},$$

and so approximations need only be generated for i=0, 1, ..., $$\left\lfloor \frac{K}{4} + 1 \right\rfloor, \text{ where } \left\lfloor \frac{x}{y} \right\rfloor$$

refers to the greatest integer in the quotient $$\frac{x}{y};$$

3. Further, since, if the particular values of the parameters $s_1$ and $s_2$ were interchanged, the vertex $v_q$ would behave in the same way, $(l_{LP}(s_1,s_2))_0 = (l_{LP}(s_2,s_1))_0$, and so the approximation may be constructed using only symmetric, second-degree polynomials in $s_1$ and $s_2$, that is, using four coefficients; and 4. Further, if "K" is a multiple of "four," then, from points (1) and (2) above, $$(l_{LP}(s_1, s_2))_{\frac{K}{4}+1} = (l_{LP}(s_2, s_1))_{\frac{K}{4}+1}.$$

Accordingly, these components can be approximated using symmetric second-degree polynomials using four coefficients.

In one embodiment, regardless of whether $$L = \frac{K}{2},$$

the approximating polynomials are computed using a least-squares Chebyshev approximation methodology. The matrix product (equation (23)) is evaluated at the points of a grid in the $(s_1,s_2)$ region made up of roots of Chebyshev polynomials $$(s_1, s_2) = \left(\cos\frac{\left(i+\frac{1}{2}\right)\pi}{N}, \cos\left(\cos\frac{\left(j+\frac{1}{2}\right)\pi}{N}\right)\right), \quad (27)$$

for i,j=0, ..., N−1. In one embodiment, "N" is taken to be "eight," so that there are "sixty-four" points in equation (27). The coefficients $b_{ij}$ (j=0, ..., 3 in the symmetric case, or j= 0, ..., 5 in the asymmetric case) for the polynomial $$(l_{LP})_i \approx b_{i0} + b_{i1}(s_1+s_2) + b_{i2}(s_1^2+s_2^2) + b_{i3}s_1s_2 \quad (28)$$

in the symmetric case $$\left(i = 0 \text{ or } \frac{K}{4} + 1\right),$$

or the polynomial $$(l_{LP})_i \approx b_{i0} + b_{i1}s_1 + b_{i2}s_2 + b_{i3}s_1^2 + b_{i4}s_2^2 + b_{i5}s_1s_2 \quad (29)$$

in the asymmetric case ("i" otherwise), are determined by a least squares methodology. In that operation, the computer graphics system 10 computes the matrix product (equation (23) evaluated at points $(s_1,s_2)$ as defined in equation (27)). Thereafter, a set of $N^2$ polynomials (equation (28) and/or (29)) are generated using the values of $s_1$ and $s_2$ at the respective points (equation (27)) in the $(s_1,s_2)$ region, with each polynomial being equal to the respective "i-th" component of the row of the matrix product. The computer graphics system 10 then determines the values of the coefficients $b_{ij}$ in the polynomials using the least squares approximation methodology. After the values of the coefficients $b_{ij}$ have been determined, they are used to generate the values of the components $(l_{LP})_i$ of limit point weight vector $l_{LP}$ using equations (28) and (29).

The error in the least squares approximation has an oscillatory behavior over the region $(s_1,s_2)$ and will be minimized if the amplitude of the oscillations is distributed evenly over the region. This can be accomplished by relaxing the constraints imposed by a weighted least squares methodology for points that are well-approximated and tightening the constraints for the points that are poorly approximated. In the weighted least squares methodology, after the values of the coefficients $b_{ij}$ have been evaluated using the least squares methodology described above, the polynomial (equation (28) and/or (29)) is evaluated at each point in the $(s_1,s_2)$ region, the value compared to the value generated for the respective component of the matrix product (equation (23)), and a weight value determined that reflects the difference therebetween. Thereafter, the weight values can be used in constraining the approximations of the values of the coefficients $b_{ij}$ in an uneven manner.

Figure 8:
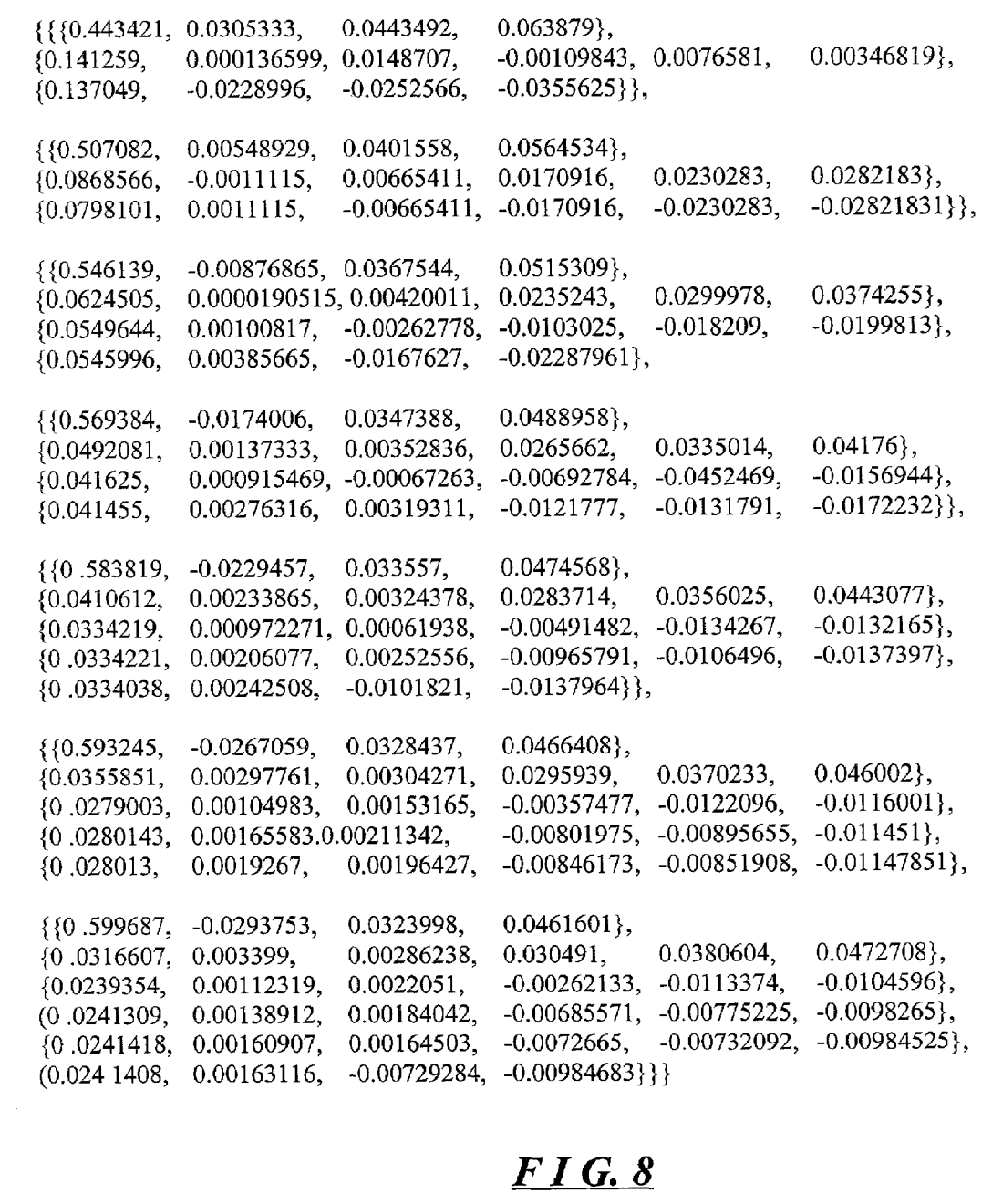

FIG. 8 depicts a table of coefficients $b_{ij}$ for K=4, 6, . . . , 16, with the indexing, in the form of the C programming language, $$b\left[\frac{K}{2} - 2\right][i][j],$$

where "i" is the index of the component of limit point weight vector $l_{LP}$, taking values in the range i=0, . . .

$$\left\lfloor\frac{K}{4} + 1\right\rfloor,$$

and "j" is the index of the coefficient $b_{ij}$ of the approximating polynomial.

After the limit point weight vector $l_{LP}$ associated with a vertex $v_q(0)$ has been generated as described above, it can be used along with the position $c^j(q)$ of the vertex $v_q(0)$ and positions $c^j(k)$ of the points $v_q(k)$, k=1, . . . , K neighboring the vertex $v_q(0)$ to determine the position $\sigma(q)$ of the limit point associated with the vertex $v_q(0)$ as follows $$\sigma(q) = \sum_{i=0}^{K} (l_{LP}(s_1, s_2))_i c^j(i), \quad (30)$$

where, as suggested above, i∈q∪N(q,j) (reference FIG. 7), and where $(l_{LP}(s_1,s_2))_i$ refers to the "i-th" component of $l_{LP}(s_1,s_2)$ which, in turn, corresponds to the limit point weight vector $l_{LP}$ for sharpness parameter values $s_1$ and $s_2$ at the definition level $j=j_D$ for the smooth feature line or at any subdivision level higher than the definition level $j_D$, and indices 0, . . . , K are as shown in FIG. 7.

One embodiment makes use of a similar polynomial approximation methodology to obtain good approximations for vectors $l_C$ and $l_S$ of weight values that are to be used in generating the tangent vectors, tangent vector weight vector $l_C$ being used in generating the tangent vector along the smooth feature line and tangent vector weight vector $l_S$ being used in generating the tangent vector across the smooth feature line at the limit point associated with the vertex $v_q(0)$ with which he respective tangent vector weight vectors is associated. In that methodology, a vector $l_C(J)$ is generated as follows:

$$l_C(J) = (0, 1, 0, \ldots, -1, 0, \ldots) \cdot \prod_{j=J}^{j_D} S_{sc,T,K,L}(s_1(j), s_2(j)), \quad (31)$$

where the two non-zero components of the row vector on the right hand side are a "one" at position "one" in the row vector, and a "negative one" at position $$\frac{K}{2} + 1,$$

and "·" refers to the dot product. After generating vector $l_C(J)$ according to equation (31), the value is normalized and the limit taken as J→∞:

$$l_C = \lim_{J \to \infty} \frac{l_C(J)}{\|l_C(J)\|}, \quad (32)$$

where $$\|v\| = \sqrt{\sum_i v_i^2},$$

that is, the Euclidean norm. The components of vector $l_C$ (equation (32)) form a sequence of weight values that are used in multiplying the respective positions of the vertex $v_q(0)$ and the points $v_q(k)$, k=1, . . . , K, around the vertex $v_q(0)$, as shown in FIG. 7, the sum of which defines the tangent vector along the smooth feature line at the point on the subdivision surface associated with the vertex $v_q(0)$.

As with the components of limit point weight vector $l_{LP}$, the components of tangent vector weight vector $l_C$ can be approximated by polynomials in $s_1$ and $s_2$, in this case third degree polynomials. Accordingly, the approximations of the components of tangent vector weight vector $l_C$ can be efficiently generated by using up to ten numbers per component and per valence. If $$L = \frac{K}{2},$$

symmetry considerations allow the number of polynomial coefficients that are used in generating components of tangent vector weight vector $l_C$ to be reduced. In that case, the components of tangent vector weight vector $l_C$ satisfy the following symmetry relations:

1. The "i-th" component and the "k+2-i-th" component of tangent vector weight vector $l_C$ are equal, that is, $(l_C)_i = (l_C)_{K+2-i}$, for $$i = \frac{K}{2} + 2, \ldots, K.$$

This is a result of the invariance of the subdivision matrix (equation (19)) upon reflection with respect to the crease line. As a result, approximations need only be generated for components $$i = 0, 1, \ldots, \frac{K}{2} + 1;$$

2. Further, since $$(l_C(s_1, s_2))_i = (l_C(s_2, s_1))_{\frac{K}{2}+2-i},$$

approximations need only be generated for components $$i = 0, 1, \ldots, \left\lfloor \frac{K}{4} + 1 \right\rfloor;$$

3. Further, since, if the particular values of the parameters $s_1$ and $s_2$ were interchanged, the vertex $v_q$ would behave in the same manner except that the orientation of the tangent vector would be reversed, $(l_C(s_1,s_2))_0 = -(l_C(s_2, s_1))_0$, in which case the approximation may be constructed using only anti-symmetric, third-degree polynomials in $s_1$ and $s_2$, using four coefficients; and 4. Further, if K is a multiple of "four," then, from points (1) and (2) immediately above, $$(l_C(s_1, s_2))_{\frac{K}{4}+1} = -(l_C(s_2, s_1))_{\frac{K}{4}+1}.$$

Accordingly, these components can be approximated using anti-symmetric polynomials using four coefficients.

In one embodiment, the approximating polynomials are also computed using a least squares Chebyshev approximation methodology similar to that used in connection with the limit point approximation described above. The matrix product of equation (31) is evaluated at points of a grid in the $(s_1,s_2)$ region made up of roots of Chebyshev polynomials (equation (27)). The coefficients $b_{ij}$ (j=0, . . . , 3, in the anti-symmetric case, or j=0, . . . , 9, in the non-symmetric case) for the polynomial $$(l_C)_i = b_{i0}(s_1-s_2) + b_{i1}(s_1{}^2 - s_2{}^2) + b_{i2}(s_1{}^3 - s_2{}^3) + b_{i3}(s_1{}^2 s_2 - s_1 s_2{}^2) \quad (33)$$

in the anti-symmetric case $$\left( i = 0 \text{ or } \frac{K}{4} + 1 \right),$$

or the polynomial $$(l_c)_i = b_{i0} + b_{i1}s_1 + b_{i2}s_2 + b_{i3}s_1^2 + \\ b_{i4}s_1s_2 + b_{i5}s_2^2 + b_{i6}s_1^3 + b_{i7}s_1^2s_2 + b_{i8}s_1s_2^2 + b_{i9}s_2^3, \quad (34)$$

in the non-symmetric case ("i" otherwise), are determined using the least squares methodology as described above.

In a manner similar to the generation of the tangent vector along the smooth feature line (reference equations (31) through (34) above), a vector $l_S$ of weight values is used in generating the tangent vector across the smooth feature line. The components of tangent vector weight vector $l_S$ comprise a sequence of weight values that are used to multiply the positions of the vertex $v_q(0)$ and points $v_q(1)$ through $v_q(K)$ around vertex $v_q(0)$ (reference FIG. 7), the sum of which comprises the tangent vector across the smooth feature line. In that methodology, a vector $l_S(J)$ is generated as follows:

$$l_S(J) = \left( 0, \sin\frac{2\pi(0)}{K}, \sin\frac{2\pi(1)}{K}, \ldots, \sin\frac{2\pi(K-1)}{K} \right). \quad (35)$$

$$\prod_{j=J}^{jD} S_{sc,T,K,L}(s_1(j), s_2(j)).$$

Vector $l_S(J)$ is normalized and the limit taken as J→∞, in the same manner as described above in connection with equation (32), to provide tangent vector weight vector $l_S$.

When $$L = \frac{K}{2},$$

tangent vector weight vector $l_S$ is $$l_S = \left( 0, \sin\frac{2\pi(0)}{K}, \sin\frac{2\pi(1)}{K}, \ldots, \sin\frac{2\pi(K-1)}{K} \right), \quad (36)$$

which is the same as in a the case of a smooth feature line associated with a sharpness parameter of zero.

The components of tangent vector weight vector $l_S$ can be approximated as $l_S(s_1,s_2)$ using third degree polynomials in sharpness parameters $s_1$ and $s_2$. The operations performed in generating the coefficients for the polynomials correspond to the operations performed in generating the coefficients for the polynomials described above for the tangent vector weight vector $l_C$ used in generating the tangent vector along the smooth feature line (equations (31) through (34)).

Figure 9:
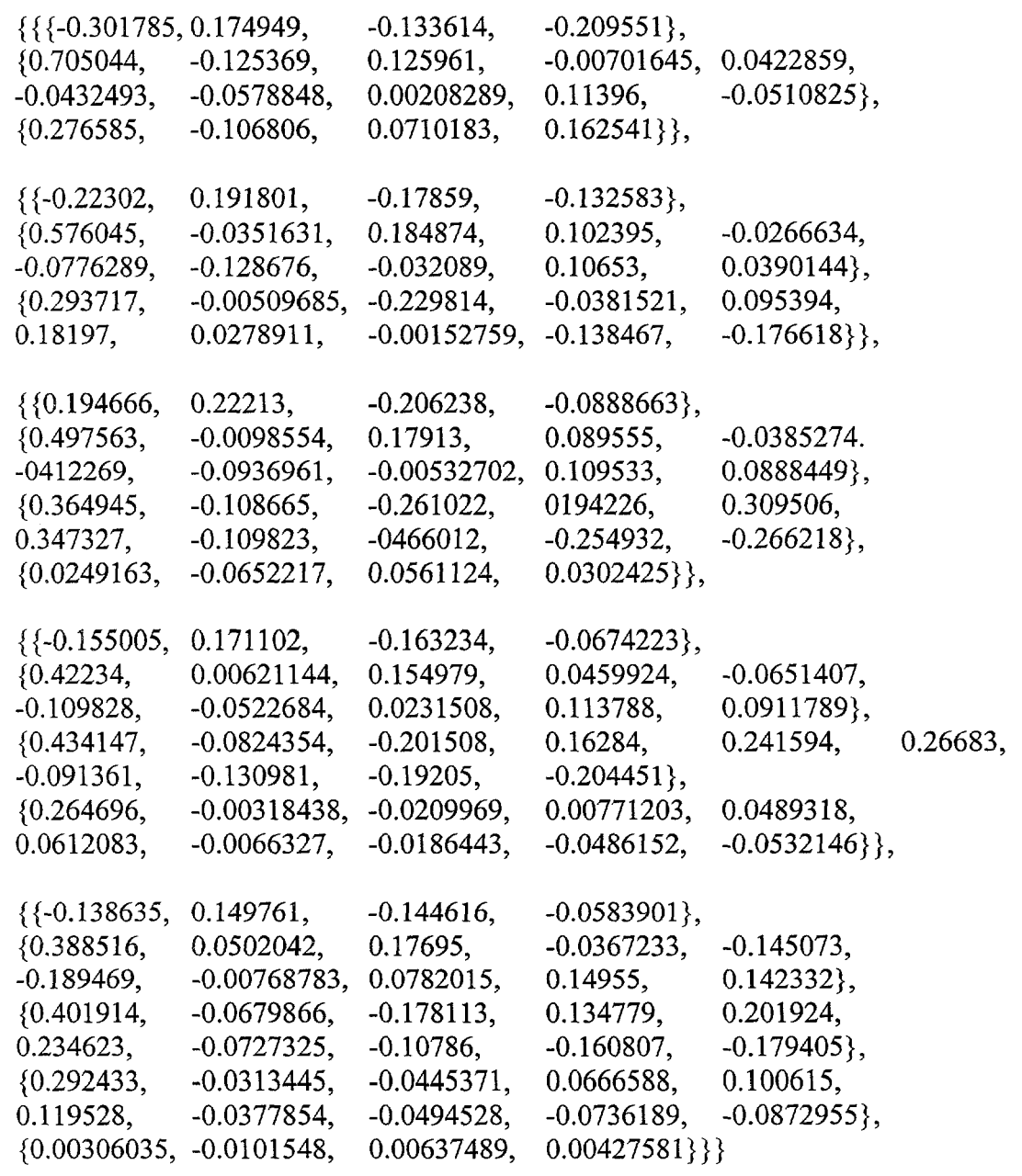

FIG. 9 depicts a table of coefficients $b_{ij}$ for K=4, 6, . . . , 12, with the indexing, in the form of the C programming language, $$b\left[\frac{K}{2} - 2\right][i][j],$$

where "i" is the index of the component of $l_C$, taking values in the range i=0, . . .

$\lfloor \frac{K}{4} + 1 \rfloor$, and "j" is the index of the coefficient $b_{ij}$ of the approximating polynomial.

As noted above, the tangent vector weight vectors $l_C(=l_C(s_1,s_2))$ and $l_S(=l_S(s_1,s_2))$ (where $s_1$ and $s_2$ are the sharpness parameter values at the definition level $j=j_D$ for the smooth feature line) are used, along with the position $c^j(q)$ of the vertex $v_q(0)$ and the positions $c^j(k)$ of the neighboring points $v_q(k)$, k=1, ..., K. In particular, the components of the respective tangent vector weight vectors are used to weight the positions of the vertex and neighboring points, with the sum comprising the tangent vector. That is, the tangent vector $e_C(q)$ along the smooth feature line and the tangent vector $e_S(q)$ across the smooth feature line are generated as $$e_C(q) = \sum_{i=0}^{K} (l_C(s_1, s_2))_i c^j(i) \tag{37}$$

$$e_S(q) = \sum_{i=0}^{K} (l_S(s_1, s_2))_i c^j(i), \tag{}$$

where $l_C(s_1,s_2)=l_C$ and $l_S(s_1,s_2)=l_S$ (where $s_1$ and $s_2$ are the sharpness parameter values at the definition level $j=j_D$ for the smooth feature line), and indices 0, ..., K are as shown in FIG. 7.

In some circumstances, it is impractical to use polynomials to generate approximations for limit point weight vector $l_{LP}$ and tangent vector weight vectors $l_C$ and $l_S$. For example, if the number of configurations of smooth feature lines, each requiring a different set of polynomials, exceeds some number, the number of polynomials would increase to an extent that it would be impractical to use that methodology. An alternative methodology makes use of extrapolation to generate approximations for limit point weight vector $l_{LP}$ and tangent vector weight vectors $l_C$ and $l_S$.

The extrapolation methodology for generating an approximation of limit point weight vector $l_{LP}(s_1,s_2)$ starts with the first few factors of equation (23) for finite values of index "j." In the following, it will be assumed that the definition level $j_D$ for the smooth feature line is level "zero," although it will be appreciated that this will not restrict the generality of the description. The matrix product generated by taking factors j=J, J-1, ..., 0 is given by $$S_{sc,T,K,L,LP}(J)(s_1, s_2) := \prod_{j=J}^{0} S_{sc,T,K,L}(s_1(j), s_2(j)), \tag{38}$$

with $$S_{sc,T,K,L,LP}(0)(s_1,s_2):=I_K+1 \tag{39}$$

where, for the limit case J=0 (in which case there would be no factors in generating the product matrix), the product matrix $S_{sc,T,K,L,LP}(0)(s_1,s_2)$ is the identity matrix of size "K+1" by "K+1." A vector of weight values $l_{LP}$ for determining the position $\sigma(q)$ of the limit point is obtained as follows:

$$l_{LP}(J)(s_1,s_2)=v_{LP} \cdot S_{sc,T,K,L,LP}(J)(s_1,s_2) \tag{40}$$

where $v_{LP}$ is as defined above in connection with equations (28) and (29).

In one embodiment, a reasonably accurate approximation of limit point weight vector $l_{LP}$ can be obtained using just the vectors corresponding to J=0, 1, 2, 3 by using polynomial extrapolation. The convergence of $l_{LP}(J)(s_1,s_2)$ to $l_{LP}(s_1,s_2)$ is very rapid, with the error $\epsilon(J)=|l_{LP}(J)-l_{LP}|$ approaching zero as $2^{-2^J}$ if the update rule described above in connection with equations (20) through (22) are used for the sharpness parameters. The approximation to $l_{LP}$ is constructed by generating the third degree polynomial that interpolates the points $\{x=2^{-2^J}, y=l_{LP}(J)\}$, J=0, 1, 2, 3, and then evaluating this polynomial by extrapolation at the point x=0, that is $$l_{LP} \approx \sum_{J=0}^{3} b_J l_{LP}(J), \tag{41}$$

where $l_{LP}(J)$ is as defined in equation (40) and where the coefficients $b_j$ are given by $$b_0 = \frac{-135}{120015} \tag{42}$$

$$b_1 = \frac{1270}{120015}$$

$$b_2 = \frac{-12192}{120015}$$

$$b_3 = \frac{131072}{120015}.$$

This extrapolation methodology can be used for any vertex, whether the vertex is regular or irregular. In addition, the methodology can be used for any configuration of creases through the respective vertex, and any value of valence "K" for the respective vertex.

An extrapolation methodology can also be used to generate the tangent vector weight vectors $l_C$ and $l_S$. Generally, in that methodology the matrix products $S_{sc,T,K,L,LP}(J)(s_1,s_2)$ described above (equations (38) and (39)), which are then
 (1) multiplied by a vector $v_C$, if tangent vector weight vector $l_C$ is being generated, or a vector $v_S$, if tangent vector weight vector $l_S$ is being generated, and
 (2) the result from (1) is thereafter multiplied by a dilation factor that maintains the respective tangent vector weight vector in normalized form.

The approximations of the tangent vector weight vectors $l_C$ and $l_S$ are generated from $$l_C(J)(s_1,s_2) = d(K)^J v_C \cdot S_{sc,T,K,L,LP}(J)(s_1,s_2)$$

$$l_S(J)(s_1,s_2) = d(K)^J v_S \cdot S_{sc,T,K,L,LP}(J)(s_1,s_2) \quad (43)$$

where $d(K)$ represents the dilation factor. The vectors $v_C$ and $v_S$ are given by $$v_C = \left(0, \cos\frac{2\pi(0)}{K}, \cos\frac{2\pi(1)}{K}, \ldots, \cos\frac{2\pi(K-1)}{K}\right) \quad (44)$$

$$v_S = \left(0, \sin\frac{2\pi(0)}{K}, \sin\frac{2\pi(1)}{K}, \ldots, \sin\frac{2\pi(K-1)}{K}\right),$$

and the dilation factor $d(K)$ is the reciprocal of one of the eigenvalues of the subdivision matrix for the smooth case, namely, $$d(K) = \frac{1}{\frac{3}{8} + \frac{1}{4}\cos\frac{2\pi}{K}}. \quad (45)$$

Approximations to the tangent vector weight vectors $l_C$ and $l_S$ are given by $$l_C = \sum_{J=0}^{3} b_J l_C(J) \quad (46)$$

$$l_S = \sum_{J=0}^{3} b_J l_S(J),$$

where the coefficients $b_J$ have the form as given in equation (42). This extrapolation methodology can be used in connection with all configurations. The tangent vector generated using the weight vector $l_C$ will be oriented approximately in the direction of the edge [1,0] between vertex $v_q(0)$ and point $v_q(1)$, and the tangent vector generated using the weight vector $l_S$ will be oriented approximately perpendicular to the edge [1,0]. Although the angle between edges [1,0] and [0,L+1] for a given level "j" in a subdivision surface is typically not one hundred and eighty degrees, as the level "j" approaches infinity, the angle will approach one hundred and eighty degrees. Accordingly, in the limit, that is, as "j" approaches infinity, the tangent vector along the edge on one side of the limit point associated with a vertex $v_q(0)$ will approach the opposite direction as the tangent vector along the edge on the other side of the limit point associated with the same vertex. Similarly, the tangent vector across the edge on one side of the limit point associated with the vertex $v_q(0)$ will approach the opposite direction as the tangent vector across the edge on the other side of the limit point associated with the same vertex.

Figure 10:
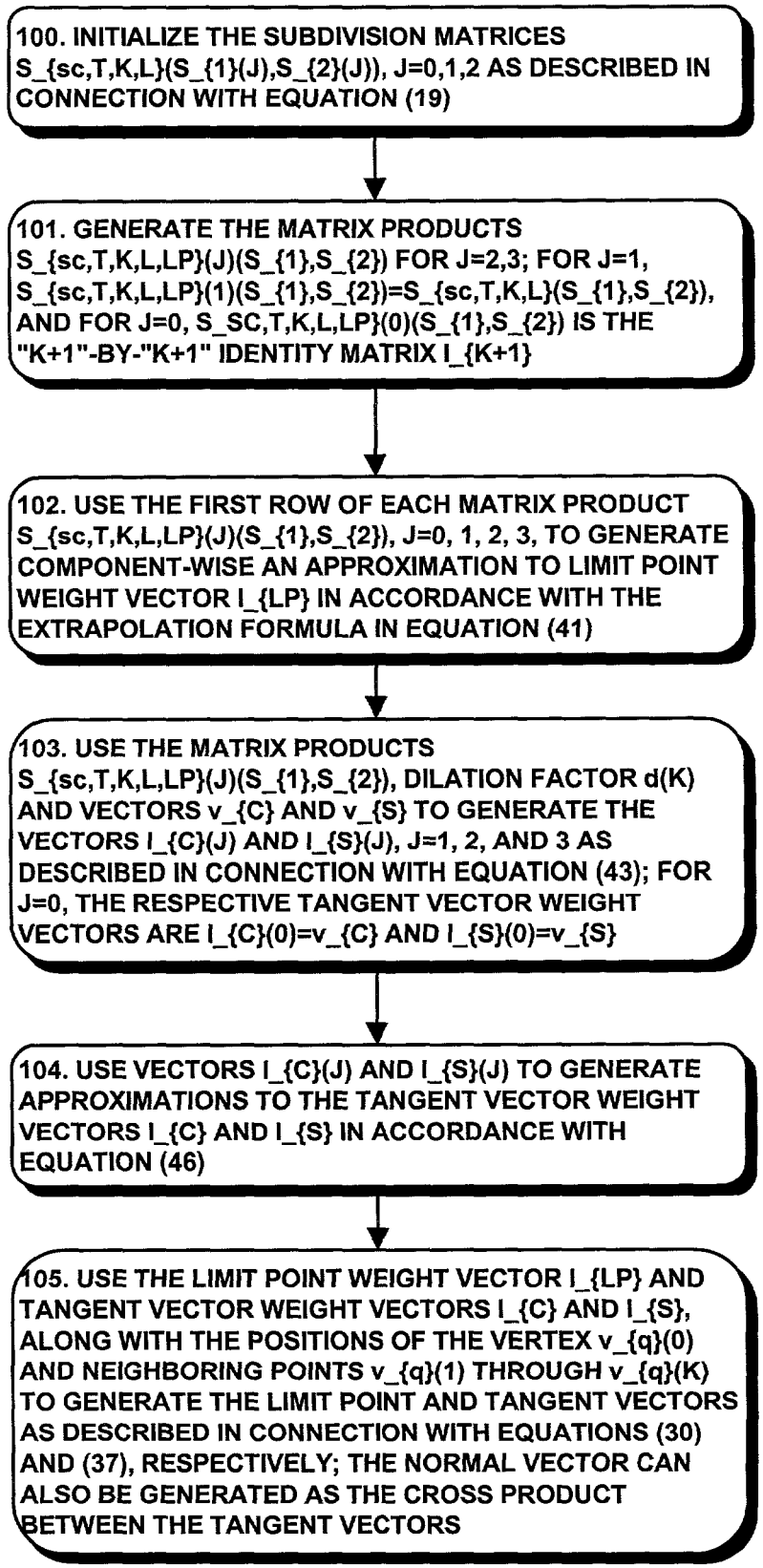
FIG. 10 depicts a flow chart describing operations performed by the computer graphics system in connection with the methodology used in connection with surfaces defined by triangular meshes described in connection with FIG. 7.

With this background, operations performed by the computer graphics system 10 in generating the weight vectors $l_{LP}$, $l_C$ and $l_S$ useful in generating the limit point and tangent vectors for a subdivision surface for a triangular mesh will be described in connection with the flowchart depicted in FIG. 10. With reference to that FIG., the computer graphics system 10 first initializes the subdivision matrices $S_{sc,T,K,L}(s_1(j),s_2(j))$, J=0, 1, 2 (step 100) as described above in connection with equation (19). Thereafter, the computer graphics system 10 generates the matrix products $S_{sc,T,K,L,LP}(J)(s_1,s_2)$ for J=2, 3 (step 101). For J=1, $S_{sc,T,K,L,LP}(1)(s_1,s_2) = S_{sc,T,K,L}(s_1,s_2)$, and as indicated above, for J=0, $S_{sc,T,K,L,LP}(0)(s_1,s_2)$ is the "K+1"-by-"K+1" identity matrix.

After the computer graphics system 10 has generated the matrix products $S_{sc,T,K,L,LP}$, it takes the first row of each matrix product $S_{sc,T,K,L,LP}(J)(s_1,s_2)$, J=0, 1, 2, 3, and generates component-wise an approximation to limit point weight vector $l_{LP}$ in accordance with the extrapolation formula in equation (41) (step 102). In addition, the computer graphics system 10 uses the matrix products $S_{sc,T,K,L,LP}(J)(s_1,s_2)$ dilation factor $d(K)$ and vectors $v_C$ and $v_S$ to generate the vectors $l_C(J)$ and $l_S(J)$, J=1, 2, and 3 as described above in connection with equation (43) (step 103). For J=0, the respective weight vectors are $l_C(0) = v_c$ and $l_S(0) = v_s$. Following step 103, the computer graphics system 10 can use $l_C(J)$ and $l_S(J)$ to generate the approximations to the tangent vector weight vectors $l_C$ and $l_S$ in accordance with equation (46) (step 104). After the limit point weight vector $l_{LP}$ and tangent vector weight vectors $l_C$ and $l_S$ have been generated, the limit point and tangent vectors can be generated as described above (reference equations (30) and (37), respectively), and the normal vector can also be generated as the cross product between the tangent vectors (step 105).

Figures 12, 13:
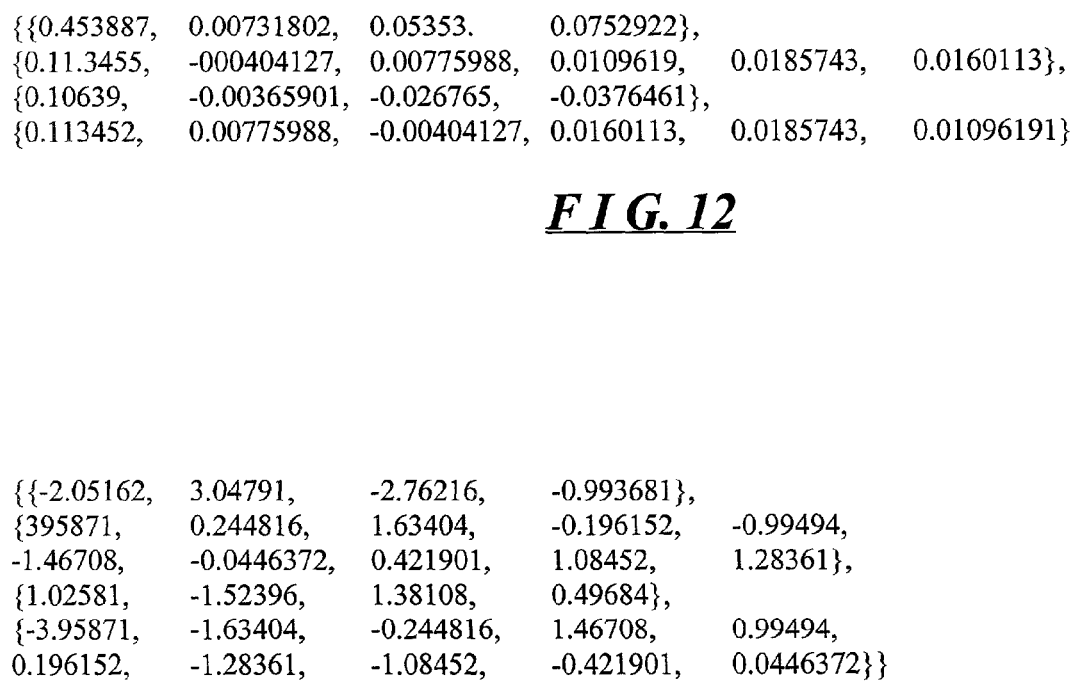

Operations performed by the computer graphics system 10 in connection with generating a smooth feature line in the case of a subdivision surface defined by a quadrilateral mesh will be described in connection with FIGS. 11 through 13 and the flow chart in FIG. 10. With reference to FIG. 11, that FIG. depicts a portion of a subdivision surface defined by a triangular mesh with vertex $v_q$ (vertex $v_q = v_q(0)$) and points $v_q(1)$ through $v_q(2K)$ with indices numbered as depicted in the FIG. It will be appreciated that points $v_q(1)$ through $v_q(K)$ are first-order neighbors of vertex $v_q$, and points $v_q(K+1)$ through $v_q(2K)$ are second-order neighbors of vertex $v_q$. The vertices are labeled such that a crease passes through point $v_q(1)$, vertex $v_q(0)$ and point $v_q(L+1)$ along edges $v_q(1)$, $v_q$ (which will be referred to as edge (1,0)) and $v_q, v_q(L+1)$ (which will be referred to as edge (0,L+1)). The value of the sharpness parameter associated with the edge (1,0) will be referred to as $s_1$ and the value of the sharpness parameter associated with the edge (0,L+1) will be referred to as $s_2$. Generally the subdivision rule described in equations (13) and (14) can be used to determine the positions of respective vertices, using, instead of the subdivision matrix described above in connection with equation (15), the subdivision matrix $$(S_{sc,Q,K,L}(s_1, s_2))_{l,m} = \tag{47}$$

$$\begin{cases}
(1-s_3)\left(1 - \frac{7}{4K}\right) + \frac{3}{4}s_3 & \text{if } l = 0, m = 0 \\
(1-s_3)\left(\frac{3}{2K^2}\right) + \frac{1}{8}s_3 & \text{if } l = 0, m = 1 \text{ or } L+1 \\
(1-s_3)\left(\frac{3}{2K^2}\right) & \text{if } l = 0, m = 2, \ldots, L \\
& \text{or } l = 0, m = L+2, \ldots, K \\
(1-s_3)\left(\frac{1}{4K^2}\right) & \text{if } l = 0, m = K+1, \ldots, 2K \\
\frac{3}{8}(1-s_2) + \frac{1}{2}s_2 & \text{if } l = 1, m = 0 \text{ or } 1 \\
\frac{1}{16}(1-s_2) & \text{if } l = L+1, m = 2, K, K+1 \text{ or } 2K \\
\frac{3}{8}(1-s_1) + \frac{1}{2}s_1 & \text{if } l = L+1, m = 0 \text{ or } L+1 \\
\frac{1}{16}(1-s_1) & \text{if } l = L+1, m = L, L+2, \\
& K+1 \text{ or } K+L+1 \\
\frac{3}{8} & \text{if } l = 2, \ldots, L, m = 0 \\
& \text{or } l = L+2, \ldots, K, m = 0 \\
& \text{or } l = m = 2, \ldots, L \text{ or } l = m = L+2, \ldots K \\
\frac{1}{16} & \text{if } l = 2, \ldots, L, m = l-1 \\
& \text{or } l = 2, \ldots, L, m = l+1 \\
& \text{or } l = 2, \ldots, L, m = K+l-1 \\
& \text{or } l = 2, \ldots, L, m = K+l \\
& \text{or } l = L+2, \ldots, K, m = l-1 \\
& \text{or } l = L+2, \ldots, K-1, m = l+1 \\
& \text{or } l = K, m = 1 \\
& \text{or } l = L+2, \ldots, K, m = K+l-1 \\
& \text{or } l = L+2, \ldots, K, m = K+l \\
\frac{1}{4} & \text{if } l = K+1, \ldots, 2K-1, m = 0, \\
& l-K, l-K+1 \text{ or } l \\
& \text{or } l = 2K, m = 0, K, 1 \text{ or } 2K \\
0 & \text{otherwise}
\end{cases}$$

is used, where, as with equation (19), $$s_3 = \frac{1}{2}(s_1 + s_2),$$

the average of the values of the parameters $s_1$ and $s_2$ associated with the edges $(1,0)$ and $(0,L+1)$.

As with the case of a subdivision surface defined by a triangular mesh, to ensure that the direction of the respective tangent vectors vary continuously at and near irregular vertices at the various subdivision levels, the value(s) of the sharpness parameter(s) are gradually reduced as the subdivision level of the mesh increases. In one embodiment, the computer graphics system varies the value(s) of the sharpness parameter(s) in the case of a subdivision surface defined by a quadrilateral mesh in the same manner as in the case of a subdivision surface defined by a triangular mesh (reference equations (20) through (22) above).

As with the case of a subdivision surface defined by a triangular mesh, to determine the positions of the limit point associated with a vertex $v_q(0)$ in the case of a subdivision surface defined by a quadrilateral mesh, the infinite subdivision matrix product $$S_{sc,Q,K,L,LP}(s_1, s_2) = \prod_{j=\infty}^{j_D} S_{sc,Q,K,L}(s_1(j), s_2(j)) \tag{48}$$

is evaluated, where $S_{sc,Q,K,L}(s_1(j),s_2(j))$ is the subdivision matrix from equation (47) for sharpness parameter values $s_1$ and $s_2$ associated with the j-th level and index $j_D$ refers to the definition level of the smooth crease. In the left-hand side of equation (48), for the arguments $s_1$ and $s_2$, $s_1=s_1(j_D)$ and $s_2=s_2(j_D)$. As in the case of a subdivision surface defined by a triangular mesh, the matrix product in equation (48) converges to a matrix with identical rows, in this case each row being of size 2K+1. A vector of weight values $l_{LP}$ for determining the position $\sigma(q)$ of a limit point associated with vertex $v_q(0)$ is obtained as follows:

$$l_{lP}(s_1,s_2) = v_{LP} \cdot S_{sc,Q,K,L,LP}(s_1,s_2) \tag{49}$$

where vector $v_{LP}$ is a vector of weights that are used in determining the position of a limit point of a subdivision surface defined by a quadrilateral mesh in the absence of a smooth feature line, that is, $$v_{LP} = \frac{1}{K(K+5)}(K^2, 4, \ldots, 4, 1, \ldots, 1), \tag{50}$$

where, in equation (50), there are "K" components having the value "four" and "K" components with value "one."

The components $l_{LP}(s_1,s_2)_i$, $i=0, \ldots, 2K$, of the row vector $l_{LP}(s_1,s_2)$, and the positions $c^j(0)$ of the vertex $v_q(0)$ and $c^j(i)$ ($i=1, \ldots, 2K$) of the neighboring points $v_q(i)$ are used to determine the position $\sigma(q)$ of a limit point associated with the vertex $v_q(0)$ as follows $$\sigma(q) = \sum_{i=0}^{2K} (l_{LP}(s_1, s_2))_i c^j(i), \tag{51}$$

where, as suggested above, $i \in \cup N_e(q,j) \cup N_f(q,j)$ (reference FIG. 11).

As with the case of a subdivision surface defined by a triangular mesh, the components of the limit point weight vector $l_{LP}(s_1,s_2)$ can be approximated using polynomial expansions. The components of limit point weight vector $l_{LP}(s_1,s_2)$ can be satisfactorily approximated by second degree polynomials in $s_1$ and $s_2$ using six values per component and per valence. If the value of "K" is even, and if $$L = \frac{K}{2},$$

symmetry considerations allow the number of values per component to be reduced. In that case, the components of limit point weight vector $l_{LP}$ satisfy the following symmetry relations:

1. the "i-th" component of limit point weight vector $l_{LP}(s_1,s_2)$ equals the "K+2-i-th" component of limit point weight vector $l_{LP}(s_1,s_2)$, that is, $(l_{LP}(s_1,s_2))_i=(l_{LP}(s_1,s_2))_{K+2-i}$, for $i=2, \ldots,$ $$\frac{K}{2},$$

and the "i-th" component of limit point weight vector $l_{LP}(s_1,s_2)$ equals the "3K+1-i-th" component of limit point weight vector $l_{LP}(s_1,s_2)$, that is, $(l_{IP}(s_1,s_2))_i=(l_{LP}(s_1,s_2))_{3K+1-i}$, for $$i = K+1, \ldots, K+\frac{K}{2};$$

2. $(l_{LP}(s_1, s_2))_i = (l_{LP}(s_1, s_2))_{\frac{K}{2}+2-i}$, for $i = 1, \ldots, \frac{K}{2}+1$, and $(l_{LP}(s_1, s_2))_i = (l_{LP}(s_1, s_2))_{2K+\frac{K}{2}+1-i}$, for $i = K+1, \ldots, K+\frac{K}{2}+1$;

3. $(l_{LP}(s_1,s_2))_0 = (l_{LP}(s_2,s_1))_0$; and

4. $(l_{LP}(s_1, s_2))_{\frac{K}{4}+1} = (l_{LP}(s_2, s_1))_{\frac{K}{4}+1}$, if "K" is a multiple of "four," and $(l_{LP}(s_1, s_2))_{K+\lfloor\frac{K}{4}\rfloor+1} = (l_{LP}(s_2, s_1))_{K+\lfloor\frac{K}{4}\rfloor+1}$, if "K" is not a multiple of "four."

Given the symmetry relations described immediately above, it is only necessary to generate approximations for limit point weight vector $l_{LP}$ for $i=0, \ldots,$ $$\left\lfloor\frac{K}{4}\right\rfloor+1$$

and $$i = K+1, \ldots, K+\left\lfloor\frac{K}{4}\right\rfloor+1,$$

and, in addition, symmetric polynomials can be used for $i=0$ for any even value of "K," as well as for $$i = \frac{K}{4}+1$$

if "K" is a multiple of "four," or $$i = K+\left\lfloor\frac{K}{4}\right\rfloor+1$$

if "K" is even but not a multiple of "four."

As in the case of a subdivision surface defined by a triangular mesh, in one embodiment i the case of a subdivision surface defined by a quadrilateral mesh, regardless of whether $$L = \frac{K}{2},$$

the approximating polynomials are computed using a least-squares Chebyshev approximation methodology (reference equation (27) above). In this case, the coefficients $b_{ij}$ (j= 0, . . . , 3 in the symmetric case, or j=0, . . . , 5 in the asymmetric case) for the polynomial $$(l_{LP})_i \approx b_{i0}+b_{i1}(s_1+s_2)+b_{i2}(s_1^2+s_2^2)+b_{i3}s_1s_2 \quad (52)$$

in the symmetric case, or the polynomial $$(l_{LP})_i \approx b_{i0}+b_{i1}s_1+b_{i2}s_2+b_{i3}s_1^2+b_{i4}s_1s_2+b_{i5}s_2^2 \quad (53)$$

in the asymmetric case, are determined by a least squares methodology. FIG. 12 depicts a table of coefficients $b_{ij}$ for K=4, L=2, for values of "i" i=0; 1; 2; 5. After the coefficients $b_{ij}$ have been generated (equations (52) and (53)), they are used to generate the limit point weight vector $l_{LP}$ in the same manner as in the case of a subdivision surface defined by a triangular mesh, which can be used to generate the position of the limit point σ(q) as described above in connection with equation (51).

The tangent vectors in the case of a subdivision surface defined by a quadrilateral mesh are generated in a manner similar to that used to generate tangent vectors in the case of a subdivision surface defined by a triangular mesh. Generally, in that methodology the matrix products $S_{sc,Q,K,L,LP}(J)(s_1,s_2)$ as described above (equation (48)) are generated, which are then (1) multiplied by a vector $v_C$, if tangent vector weight vector $l_C$ is being generated, or a vector $v_S$, if tangent vector weight vector $l_S$ is being generated, and (2) the result from (1) is thereafter multiplied by a dilation factor that maintains the respective tangent vector in normalized form, as in the case of the tangent vector weight vectors in the case of a triangular mesh. Initially, the vectors $l_C(J)(s_1,s_2)$ and $l_S(J)(s_1,s_2)$ are generated as $$l_C(s_1,s_2)=d(K)^J v_C \cdot S_{sc,Q,K,L,LP}(J)(s_1,s_2) \quad (54)$$

$$l_S(s_1,s_2)=d(K)^J v_s \cdot S_{sc,Q,K,L,LP}(J)(s_1,s_2)$$

In the case of a subdivision surface defined by a quadrilateral mesh, the respective vectors $v_C$ and $v_S$ are given by $$(v_C)_i = \begin{cases} 0 & \text{if } i = 0 \\ A_K = \cos\frac{2\pi(i-1)}{K} & \text{if } i = 1, \ldots, K \\ \cos\frac{2\pi(i-K-1)}{K} + \cos\frac{2\pi(i-K)}{K} & \text{if } i = K+1, \ldots, 2K \end{cases} \quad (55)$$

$$(v_S)_i = \begin{cases} 0 & \text{if } i = 0 \\ A_K = \sin\frac{2\pi(i-1)}{K} & \text{if } i = 1, \ldots, K \\ \sin\frac{2\pi(i-K-1)}{K} + \sin\frac{2\pi(i-K)}{K} & \text{if } i = K+1, \ldots, 2K \end{cases},$$

and the dilation factor is given as the reciprocal of the subdominant eigenvalue of the subdivision matrix (equation 47) for a smooth interior vertex:

$$d(K) = \frac{1}{\frac{A_K}{16} + \frac{1}{4}}, \quad (56)$$

where $A_K$ is defined by $$A_K = 1 + \cos\left(\frac{2\pi}{K}\right) + \cos\left(\frac{\pi}{K}\right)\sqrt{2\left(9 + \cos 2\frac{\pi}{K}\right)}. \quad (57)$$

The tangent vector weight vectors $l_C$ and $l_S$ are used to generate the tangent vectors as follows:

$$e_C(q) = \sum_{i=0}^{2K} (l_c(s_1, s_2))_i c^j(i) \quad (58)$$

$$e_S(q) = \sum_{i=0}^{2K} (l_c(s_1, s_2))_i c^j(i),$$

where the indexing is as shown in FIG. 11.

As in the case of a subdivision surface defined by a triangular mesh, in the case of a subdivision surface defined by a quadrilateral mesh the tangent vector $e_C(q)$ generated for a vertex $v_q(0)$ generated using the tangent vector weight vector $l_C$ will be oriented approximately along the smooth feature line through the limit point associated with the vertex $v_q(0)$, and the tangent vector $e_S(q)$ that is generated using the tangent vector weight vector $l_S$ will be oriented approximately perpendicular to the smooth feature line through the limit point associated with the vertex $v_q(0)$.

Also, as with the case of a subdivision surface defined by a triangular mesh, the tangent vector weight vectors in the case of a subdivision surface defined by a quadrilateral mesh can be approximated using polynomial approximations. The components of tangent vector weight vectors $l_C(s_1,s_2)$ and $l_S(s_1,s_2)$ can be satisfactorily approximated by third degree polynomials in $s_1$ and $s_2$ using, in general, ten values per component and per valence If the value of "K" is even, and if $$L = \frac{K}{2},$$

symmetry considerations allow the number of values per component to be reduced. In that case, the components of tangent vector weight vector $l_C$ satisfy the following symmetry relations:

1. the "i-th" component of tangent vector weight vector $l_C(s_1,s_2)$ equals the "K+2-i-th" component of tangent vector weight vector tangent vector weight vector $l_C(s_1, s_2)$, that is, $(l_C(s_1,s_2))_i = (l_C(s_1,s_2))_{K+2-i}$, for $$i = 2, \ldots, \frac{K}{2},$$

and the "i-th" component of tangent vector weight vector $l_C(s_1,s_2)$ equals the "3K+1-i-th" component of tangent vector weight vector $l_C(s_1,s_2)$, that is, $(l_C(s_1,s_2))_i = (l_C(s_1, s_2))_{3K+1-i}$, for

2.

$$i = K+1, \ldots, K + \frac{K}{2};$$

$$(l_C(s_1, s_2))_i = -(l_C(s_1, s_2))_{\frac{K}{2}+2-i}, \text{ for } i = 1, \ldots, \frac{K}{2} + 1, \text{ and}$$

$$(l_C(s_1, s_2))_i = -(l_C(s_1, s_2))_{2K+\frac{K}{2}+1-i}, \text{ for } i = K+1, \ldots, K + \frac{K}{2} + 1;$$

3. $(l_C(s_1,s_2))_0 = -(l_C(s_2,s_1))_0$; and
4.

$$(l_C(s_1, s_2))_{\frac{K}{4}+1} = -(l_C(s_2, s_1))_{\frac{K}{4}+1},$$

if "K" is a multiple of "four," and $$(l_C(s_1, s_2))_{K+\lfloor \frac{K}{4} \rfloor+1} = -(l_C(s_2, s_1))_{K+\lfloor \frac{K}{4} \rfloor+1},$$

if "K" is not a multiple of "four."

Given the symmetry relations described immediately above, it is necessary to generate aprroximations for $$i = 0, \ldots, \left\lfloor \frac{K}{4} \right\rfloor + 1 \text{ and } i = K+1, \ldots, K + \left\lfloor \frac{K}{4} \right\rfloor + 1,$$

and, in addition, anti-symmetric polynomials can be used for i=0 for any even value of "K," as well as for $$i = \frac{K}{4} + 1$$

if "K" is a multiple of "four," or $$i = K + \left\lfloor \frac{K}{4} \right\rfloor + 1$$

if "K" is not a multiple of "four."

As in the case of a subdivision surface defined by a triangular mesh, in one embodiment, the approximating polynomials are also computed using a least squares Chebyshev approximation methodology similar to that used in connection with the limit point approximation described above. The matrix product of equation (48) is evaluated at points of a grid in the $(s_1,s_2)$ region made up of roots of Chebyshev polynomials (equation (27)). In this case, the coefficients $b_{ij}$ (j=0, ... , 3, in the anti-symmetric case, or j=0, ... , 9, in the non-symmetric case) for the polynomial $$(l_C) \approx b_{l0}(s_1-s_2)+b_{l1}(s_1{}^2-s_2{}^2)+b_{l2}(s_1{}^3-s_2{}^3)+b_{l3}(s_1{}^2 s_2 - s_1 s_2{}^2) \quad (59)$$

in the anti-symmetric case, or the polynomial $$(l_C) \approx b_{l0}+b_{l1}s_1+b_{l2}s_2+b_{l3}s_1{}^2+b_{l4}s_1 s_2+b_{l5}s_2{}^2+b_{l6}s_1{}^3+ b_{l7}s_1{}^2 s_2+b_{l8}s_1 s_2{}^2+b_{l9}s_2{}^3 \quad (60)$$

in the non-symmetric case, are determined using the least squares methodology. Operations performed in connection with the least squares methodology correspond to those described above in the case of a subdivision surface defined by a triangular mesh. The components of tangent vector weight vector $l_S$ can be approximated as $l_S(s_1,s_2)$ using third degree polynomials in sharpness parameters $s_1$ and $s_2$. The operations performed in generating the coefficients for the polynomials correspond to the operations performed in generating the coefficients for the polynomials described above for the tangent vector weight vector $l_C$ used in generating the tangent vector along the smooth feature line. FIG. 13 depicts a table of coefficients $b_{ij}$ for K=4, L=2, corresponding to i=0; 1; 2; 5.

After the tangent vector weight vectors $l_C$ and $l_S$ have been generated, they are used to generate the tangent vectors $e_C$ and $e_S$ as described above in connection with equation (58).

As in the case of a subdivision surface defined by a triangular mesh, in some circumstances, it is impractical to use polynomials to generate approximations for limit point weight vector $l_{LP}$ and tangent vector weight vectors $l_C$ and $l_S$. An alternative methodology makes use of polynomial extrapolation to generate approximations for limit point weight vector $l_{LP}$ and tangent vector weight vectors $l_C$ and $l_S$. This extrapolation methodology is similar to the methodology described above in connection with equations 38-46.

Operations performed by the computer graphics system 10 in connection with generating the limit point weight vector $l_{LP}$ and tangent vector weight vectors $l_C$ and $l_S$ for a subdivision surface defined by a quadrilateral mesh, using the polynomial extrapolation methodology, are similar to those described above in connection with FIG. 10 for a subdivision surface defined by a triangular mesh, and reference should be made to FIG. 10 for that description.

The arrangement provides a number of advantages. In particular, the invention provides an arrangement for generating a subdivision surface from a representation defined by a control mesh at a selected level, by applying the same parameterized subdivision rule at each level, with the value (s) of the parameter(s) varying at at least some of the levels. The invention specifically provides for the generation of a smooth feature line in a subdivision surface using the same parameterized subdivision rule at each level, with the value (s) of the parameter(s) defining the smooth feature line varying at at least some of the levels. The resulting subdivision surface is of relatively high quality and can be efficiently evaluated.

It will be appreciated that numerous changes and modifications may be made to the arrangement as described herein. For example, it will be appreciated that, although the arrangement has been described in connection with meshes of triangular and quadrangular faces, it will be appreciated that the arrangement may find utility in connection with meshes having faces of different polygonal structures.

Furthermore, although specific subdivision rules (equations (19) and (46)) have been described, it will be appreciated that other subdivision rules may find utility.

In addition, although a methodology has been described for updating the sharpness parameters $s_1$ and $s_2$, and although various methodologies have been described for approximating weight vectors $l_{LP}$, $l_C$ and $l_S$, it will be appreciated that other parameter update and approximation methodologies may find utility.

Furthermore, in connection with the extrapolation methodologies descrbied herein, it will be appreciated that the number of coefficients $b_j$, and the upper limit ("three") on the summations in equations (41) and (46) may differ if a polynomial other than of order "three" is used in the extrapolation.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An arrangement for generating a representation of a feature in a surface defined by a mesh representation, the mesh comprising at a selected level a plurality of points including at least one point, referred to as a vertex, connected to a plurality of neighboring points by respective edges, the feature being defined in connection with the vertex and at least one of the neighboring points and the edge interconnecting the vertex and the at least one of the neighboring points in the mesh representation, the feature generating arrangement comprising:

A. a weight vector generator module configured to generate at least one weight vector based on a parameterized subdivision rule defined at a plurality of levels, for which a value of at least one parameter differs at at least two levels in the mesh; and B. a feature representation generator module configured to use the at least one weight vector and positions of the vertex and the neighboring points to generate the representation of the feature, wherein the feature is a smooth feature line defined in connection with the vertex and two neighboring points and edges interconnecting the vertex and the respective neighboring points, the weight vector generator module being configured to make use of the parameterized subdivision rule having a parameter value associated with each of the edges along which the smooth feature line is defined, wherein the weight vector generator module is configured to make use of parameters associated with the edges along which the smooth feature line is defined whose values differ, and wherein the weight vector generator module is configured to make use of the parameters that are in relation to a subdivision rule that, in turn, reflects a sharp crease along the edges along which the smooth feature line is defined, the values of the parameters being defined in the interval [0,1], where higher values define a sharper crease, the values of the parameters at a lower level being related to the values of the parameters at a higher level being related by $$s_1(j+1) = (\tfrac{3}{4}s_1(j) + \tfrac{1}{4}s_2(j))^2,$$

and $$s_2(j+1) = (\tfrac{1}{4}s_1(j) + \tfrac{3}{4}s_2(j))^2$$

where $s_1(j)$ and $s_2(j)$ represent the values of the parameters associated with the respective edges at level "j," and $s_1(j+1)$ and $s_2(j+1)$ represent the values of the parameters associated with the respective edges at the higher level "j+1."

* * * * *